US012511786B2

(12) United States Patent
Berger et al.

(10) Patent No.: US 12,511,786 B2
(45) Date of Patent: Dec. 30, 2025

(54) NEURAL NETWORK CHANNEL-WISE TILING WITH OVERLAPS

(71) Applicant: QUALCOMM Incorporated, San Diego, CA (US)

(72) Inventors: Guillaume Jean Fernand Berger, Toronto (CA); Antoine Clement Mercier, Loutraki (GR); Yashesh Sureshchandra Savani, North York (CA); Sunny Praful Kumar Panchal, Stoney Creek (CA); Fatih Murat Porikli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 421 days.

(21) Appl. No.: 18/319,209

(22) Filed: May 17, 2023

(65) Prior Publication Data

US 2024/0386612 A1  Nov. 21, 2024

(51) Int. Cl.
*G06K 9/00*  (2022.01)
*G06T 7/00*  (2017.01)

(52) U.S. Cl.
CPC ...... *G06T 7/97* (2017.01); *G06T 2207/10024* (2013.01); *G06T 2207/20084* (2013.01)

(58) Field of Classification Search
CPC ............. G06T 7/97; G06T 2207/10024; G06T 2207/20084; G06N 3/0464
See application file for complete search history.

(56) References Cited

U.S. PATENT DOCUMENTS 11,250,061 B1 * 2/2022 Nama ..................... G06N 3/084
11,669,939 B1 * 6/2023 Ferrés ....................... G06T 5/60
                                                                      382/167

(Continued)

OTHER PUBLICATIONS

Benjdira B., et al., "Streamlined Global and Local Features Combinator (SGLC) for High Resolution Image Dehazing", Arxiv.Org, Cornell University Library, 201 Olin Library Cornell University Ithaca, NY 14853, Apr. 26, 2023, XP091494832, 10 pages, abstract, sections 3, 3.1, 3.2, 3.3, 4.1, Algorithms 1, 2, 3, figure 1.

(Continued)

*Primary Examiner* — Gregory A Morse
*Assistant Examiner* — Owais Iqbal Memon
(74) *Attorney, Agent, or Firm* — Polsinelli LLP

(57) ABSTRACT

Systems and techniques are provided for processing image data. For example, a process can include receiving an input image comprising a padded image including a plurality of padding pixels located around a perimeter of the frame of image data. A plurality of overlapping image patches can be generated, each corresponding to a respective portion of the padded image and having a resolution. A channel-wise grouped input can be generated from the plurality of overlapping image patches and having the resolution, and includes a corresponding channel for each respective channel of each overlapping image patch of the plurality of overlapping image patches. An image processing output can be generated based on processing the channel-wise grouped input using a plurality of grouped convolutional layers of a tiled neural network, wherein at least one grouped convolutional layer of the plurality of grouped convolutional layers does not perform internal padding.

26 Claims, 9 Drawing Sheets

(56) References Cited

U.S. PATENT DOCUMENTS

2020/0097778 A1    3/2020  Rozner et al.
2025/0014323 A1*   1/2025  Pawlowicz .......... G06V 10/774

OTHER PUBLICATIONS

International Search Report and Written Opinion—PCT/US2024/021770—ISA/EPO—Jul. 16, 2024.
Shi B., et al., "Efficient Super-Resolution System With Block-Wise Hybridization and Quantized Winograd on FPGA", IEEE Transactions on Computer-Aided Design of Integrated Circuits and Systems, IEEE, USA, vol. 42, No. 11, Feb. 21, 2023, XP011951655, Nov. 2023, pp. 3910-3924, abstract, section IV, figure 2.
Yu H., et al., "High-Resolution Deep Image Matting", Arxiv.Org, Cornell University Library, 201 Olin Library Cornell University Ithaca, NY 14853, arXiv:2009.06613v1 [cs.CV], Sep. 14, 2020, XP081762689, pp. 1-12, abstract, sections 3, 4, figures 2, 3.

* cited by examiner

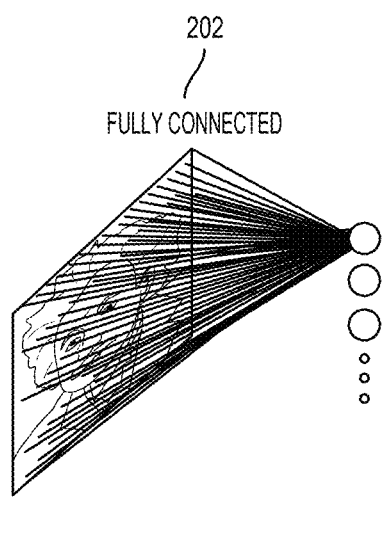
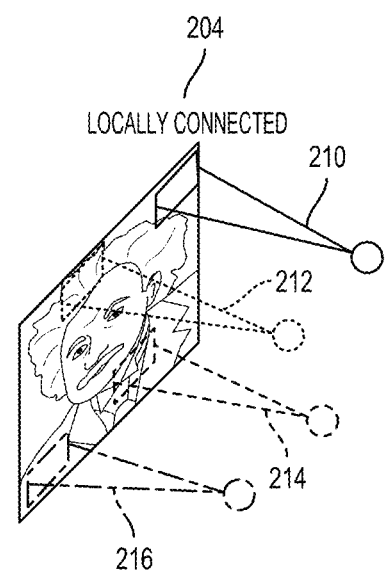
FIG. 2A  FIG. 2B

NEURAL NETWORK CHANNEL-WISE TILING WITH OVERLAPS

FIELD

The present disclosure generally relates to image processing. For example, aspects of the present disclosure are related to systems and techniques for performing image processing using one or more convolutional neural networks.

BACKGROUND

Many devices and systems allow a scene to be captured by generating images (or frames) and/or video data (including multiple frames) of the scene. For example, a camera or a device including a camera can capture a sequence of frames of a scene (e.g., a video of a scene). In some cases, the sequence of frames can be processed for performing one or more functions, can be output for display, can be output for processing and/or consumption by other devices, among other uses.

An artificial neural network can be implemented using computer technology inspired by the biological neural networks that constitute animal brains. Deep neural networks, such as convolutional neural networks, are widely used for numerous applications, such as object detection, object classification, object tracking, big data analysis, among others. For example, convolutional neural networks are able to extract high-level features, such as facial shapes, from an input image, and use these high-level features to output a probability that, for example, an input image includes a particular object.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for performing image processing using one or more convolutional neural networks. According to at least one illustrative example, a method of processing image data is provided. The method includes: receiving an input image, wherein the input image is a padded image including a frame of image data and a plurality of padding pixels located around a perimeter of the frame of image data; generating a plurality of overlapping image patches, each overlapping image patch of the plurality of overlapping image patches corresponding to a respective portion of the padded image and having a resolution; generating a channel-wise grouped input based on the plurality of overlapping image patches and having the resolution, wherein the channel-wise grouped input includes a corresponding channel for each respective channel of each overlapping image patch of the plurality of overlapping image patches; and generating an image processing output based on processing the channel-wise grouped input using a plurality of grouped convolutional layers of a tiled neural network, wherein at least one grouped convolutional layer of the plurality of grouped convolutional layers does not perform internal padding.

In another illustrative example, an apparatus is provided for processing image data. The apparatus includes at least one memory and at least one processor coupled to the at least one memory and configured to: receive an input image, wherein the input image is a padded image including a frame of image data and a plurality of padding pixels located around a perimeter of the frame of image data; generate a plurality of overlapping image patches, each overlapping image patch of the plurality of overlapping image patches corresponding to a respective portion of the padded image and having a resolution; generate a channel-wise grouped input based on the plurality of overlapping image patches and having the resolution, wherein the channel-wise grouped input includes a corresponding channel for each respective channel of each overlapping image patch of the plurality of overlapping image patches; and generate an image processing output based on processing the channel-wise grouped input using a plurality of grouped convolutional layers of a tiled neural network, wherein at least one grouped convolutional layer of the plurality of grouped convolutional layers does not perform internal padding.

In another illustrative example, a non-transitory computer-readable storage medium comprising instructions stored thereon which, when executed by at least one processor, causes the at least one processor to: receive an input image, wherein the input image is a padded image including a frame of image data and a plurality of padding pixels located around a perimeter of the frame of image data; generate a plurality of overlapping image patches, each overlapping image patch of the plurality of overlapping image patches corresponding to a respective portion of the padded image and having a resolution; generate a channel-wise grouped input based on the plurality of overlapping image patches and having the resolution, wherein the channel-wise grouped input includes a corresponding channel for each respective channel of each overlapping image patch of the plurality of overlapping image patches; and generate an image processing output based on processing the channel-wise grouped input using a plurality of grouped convolutional layers of a tiled neural network, wherein at least one grouped convolutional layer of the plurality of grouped convolutional layers does not perform internal padding.

In another illustrative example, an apparatus is provided for processing image data. The apparatus includes: means for receiving an input image, wherein the input image is a padded image including a frame of image data and a plurality of padding pixels located around a perimeter of the frame of image data; means for generating a plurality of overlapping image patches, each overlapping image patch of the plurality of overlapping image patches corresponding to a respective portion of the padded image and having a resolution; means for generating a channel-wise grouped input based on the plurality of overlapping image patches and having the resolution, wherein the channel-wise grouped input includes a corresponding channel for each respective channel of each overlapping image patch of the plurality of overlapping image patches; and means for generating an image processing output based on processing the channel-wise grouped input using a plurality of grouped convolutional layers of a tiled neural network, wherein at least one grouped convolutional layer of the plurality of grouped convolutional layers does not perform internal padding.

Aspects generally include a method, apparatus, system, computer program product, non-transitory computer-readable medium, user device, user equipment, wireless communication device, and/or processing system as substantially described with reference to and as illustrated by the drawings and specification.

Some aspects include a device having a processor configured to perform one or more operations of any of the methods summarized above. Further aspects include processing devices for use in a device configured with processor-executable instructions to perform operations of any of the methods summarized above. Further aspects include a non-transitory processor-readable storage medium having stored thereon processor-executable instructions configured to cause a processor of a device to perform operations of any of the methods summarized above. Further aspects include a device having means for performing functions of any of the methods summarized above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

BRIEF DESCRIPTION OF THE DRAWINGS

The accompanying drawings are presented to aid in the description of various aspects of the disclosure and are provided solely for illustration of the aspects and not limitation thereof. So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 2A illustrates an example of a fully connected neural network, in accordance with some examples;

FIG. 2B illustrates an example of a locally connected neural network, in accordance with some examples;

DETAILED DESCRIPTION

Figure 1:
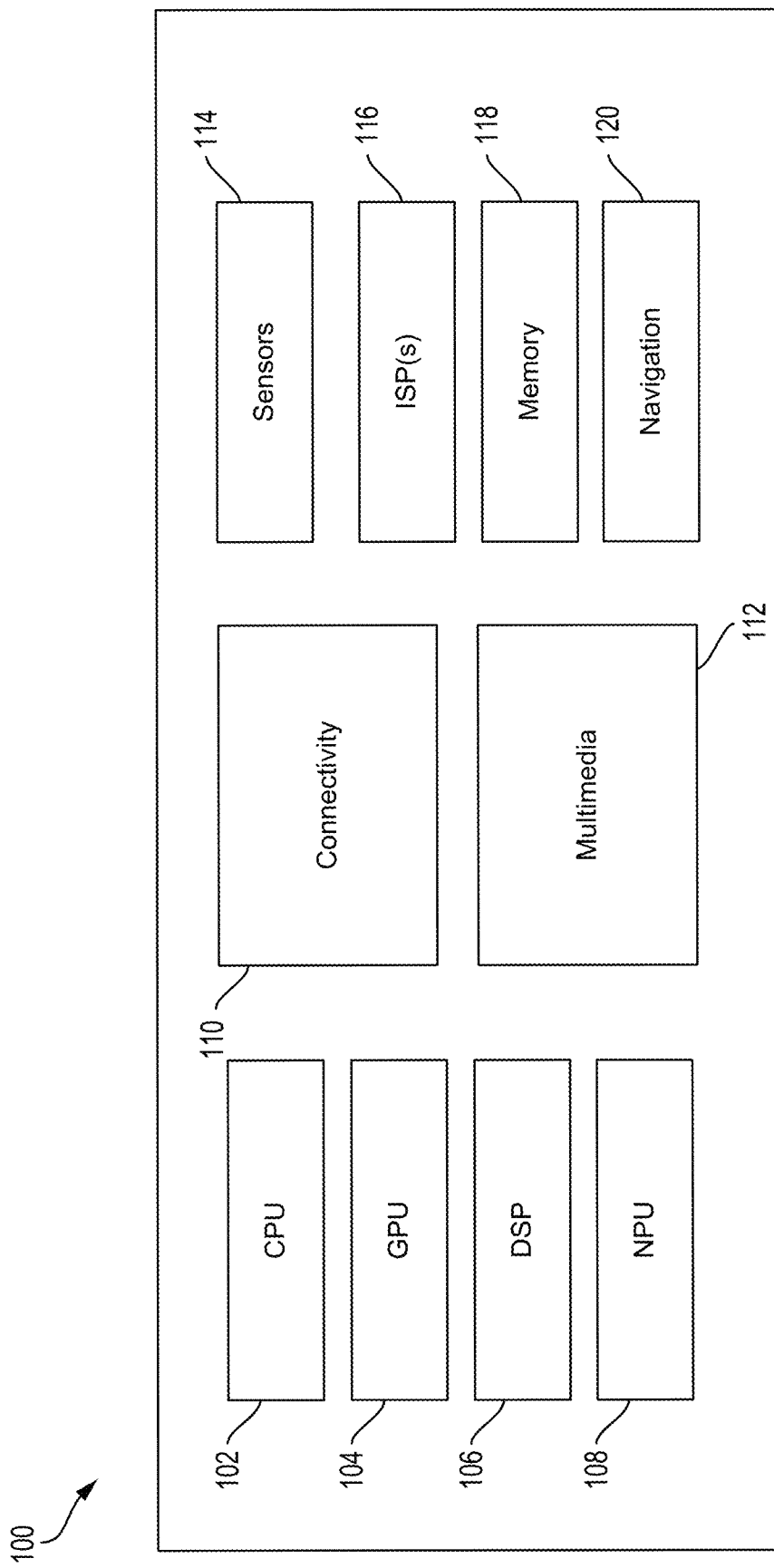
FIG. 1 illustrates an example implementation of a system-on-a-chip (SoC), in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

Demand for and consumption of image and video data has significantly increased in consumer and professional settings. As previously noted, devices and systems are commonly equipped with capabilities for capturing and processing image and video data. For example, a camera or a computing device including a camera (e.g., a mobile telephone or smartphone including one or more cameras) can capture a video and/or image of a scene, a person, an object, etc. The image and/or video can be captured and processed and output (and/or stored) for consumption. The image and/or video can be further processed for certain effects, such as compression, frame rate up-conversion, sharpening, color space conversion, image enhancement, upscaling or resolution enhancement, high dynamic range (HDR), denoising, low-light compensation, among others. The image and/or video can also be further processed for certain applications such as computer vision, extended reality (e.g., augmented reality, virtual reality, and the like), image recognition (e.g., face recognition, object recognition, scene recognition, etc.), and autonomous driving, among others. In some examples, the image and/or video can be processed using one or more image or video artificial intelligence (AI) models, which can include, but are not limited to, AI quality enhancement and AI augmentation models.

Image and video processing operations can be computationally intensive. In some cases, image and video processing operations can become increasingly computationally intensive as the resolution of the input image or frame of video data increases (e.g., as the number of pixels to be processed per input image or frame of video data increases). For example, a frame of video data with a 4K resolution can include approximately four times as many individual pixels as a frame of video data with a full HD (e.g., 1080p) resolution. In some examples, image and video processing operations can be performed by processing each pixel individually. In some examples, image and video processing operations can be performed using one or more machine learning models to derive a mapping from input image data (e.g., raw image data captured by one or more image sensors) to a final output image. As used herein, the terms "image processing" and "video processing" may be used interchangeably, such as in describing an image processing neural network and a video processing neural network (e.g., based on video data comprising a series of frames (e.g., images) that may be processed consecutively).

For example, one or more machine learning models can be used to derive a mapping between raw image data that includes a color value for each pixel location and a final output image. The final output image can include processed image data derived from the raw image data (e.g., based on the mapping learned by the one or more machine learning models). In some examples, one or more machine learning models can be implemented in an image signal processor (ISP) of a smartphone, camera, or other computing device, and used to process captured frames of video data. For example, one or more machine learning models can be used to perform processing operations for captured frames of video data, such as denoising, deblurring, high dynamic range (HDR) imaging, upscaling (e.g., super resolution), compression, etc. In another example, one or more machine learning models can additionally, or alternatively, be used to perform processing operations such as depth-estimation, semantic segmentation, human pose estimation, etc., using the captured frames of video data as input.

In some examples, the one or more machine learning models can include a neural network trained to perform the image and/or video processing task(s). For example, the neural network can be implemented using a convolutional neural network (CNN) architecture including one or more convolutional filters, and/or can be implemented using a recurrent neural network (RNN) architecture using one or more recurrent connections and recurrent states. An image processing neural network can include an input layer, multiple hidden layers, and an output layer. The input layer can include the raw image data from one or more image sensors. The hidden layers can include convolutional filters that can be applied to the input data, or to the outputs from previous hidden layers to generate feature maps. The filters of the hidden layers can include weights used to indicate an importance of the nodes of the filters. In some cases, the neural network can have a series of many hidden layers, with early layers determining simple and low-level characteristics of the raw image input data, and later layers building up a hierarchy of more complex and abstract characteristics. The neural network can then generate the final output image (e.g., making up the output layer) based on the determined high-level features.

Machine learning networks that receive as input a first image data (e.g., raw image data) and generate as output a second image data (e.g., a final processed image) can be referred to as image-to-image translation networks, or image2image networks. As mentioned previously, image or video processing operations performed using a machine learning (e.g., image2image) network can increase in computational complexity as the number of pixels per input image or video frame increases. In some cases, image or video processing operations performed using a machine learning (e.g., image2image) network can increase in computational complexity as the number of hidden layers increases, as the number of nodes or activation functions increases, and/or as the number of connections between nodes or layers increases. For example, a node (e.g., neuron) in a neural network can apply an activation function to a group of weighted inputs, and return an output generated by the activation function. An increase in the number of hidden layers or nodes can cause an increase in the computational complexity of an image processing machine learning (e.g., image2image) network, based on a greater number of mathematical operations being performed for each image that is processed.

An increase in the number of hidden layers or nodes can also cause an increase in the size of an image processing machine learning (e.g., image2image) network. For example, the activation functions and weights associated with a neural network can each be associated with one or more numerical values (e.g., numerical values used to apply the activation function or weight). As the number of hidden layers or nodes of a machine learning network increases, the number (e.g., quantity) of numerical values that are stored and applied in association with the machine learning network also increases.

As mentioned previously, the operations implemented to perform image and/or video processing operations can be computationally intensive and can place a significant burden on the hardware resources of a device. For example, the computational complexity of image and video processing operations performing using a machine learning network (e.g., neural network) can increase as the resolution of each frame of video data (e.g., image) increases. For instance, a frame of 4K video data includes approximately four times as many individual pixels as a frame of full HD video data, and computational complexity of a video processing operation may increase based on being performed for an increased quantity of pixels. In some cases, the size and complexity of a machine learning network used to perform image and video processing operations may also increase as the framerate of an input video image data increases. For example, each frame of video data included in a 4K 60 fps video must be processed in half the time available for processing a 4K 30 fps frame, when real-time video processing operations are desired (e.g., $\frac{1}{60}s$ vs. $\frac{1}{30}s$).

In some cases, one or more machine learning models for performing image processing (e.g., image processing machine learning models) can be implemented using hardware acceleration. ML and/or AI accelerators can be provided as hardware accelerators or other computing systems designed to accelerate AI and ML applications. For instance, ML and/or AI accelerators may include manycore designs for performing accelerated low-precision arithmetic, etc. For example, a Neural Processing Unit (NPU) can be a microprocessor that accelerates neural network-based machine learning models, such as artificial neural network (ANN) models, convolutional neural network (CNN) models, recurrent neural network (RNN) models, etc. An NPU can also be referred to as a Neural Processing Engine (NPE) and/or a Neural Signal Processor (NSP).

In some examples, one or more image processing machine learning models (e.g., neural networks) can be implemented by a smartphone, mobile computing device, or other edge computing device that includes or is otherwise associated with a camera or other image capture device. In some cases, smartphones or other edge computing devices implementing image processing machine learning models can be limited by a combination of the device's available computation resources and the device's power supply and/or consumption limits. In some examples, smartphones and other edge computing devices associated with limited computational resources and power can implement image processing machine learning models by using a model with a reduced size. For example, the size of an image processing machine learning model can be reduced by decreasing the total number of hidden layers, nodes, activation functions, weights, etc., that are applied by the machine learning model in generating a processed output image based on a raw image data input. In some cases, the size of a machine learning model can be reduced by decreasing the total quantity of channels associated with the machine learning model. For instance, a 3-channel image may be provided as input to a multilayer machine learning network with a plurality of convolutional layers. Each convolutional layer comprises a plurality of filters that are used to generate a corresponding plurality of feature maps organized as channels. In some examples, the layers of a machine learning network (e.g., a neural network, etc.) can include large quantities of channels (e.g., 64 channels, 128 channels, 512 channels, etc.), many of which may have smaller feature maps than the input. In some examples, ML accelerators may be designed to process, for example, 32 channels at a time with smaller feature maps. A 32-channel ML accelerator can have a high utilization rate or utilization percentage for many layers of some multi-channel machine learning networks. However, in the example above where the input layer includes only 3 channels (e.g., corresponding to the 3 channels of the 3-channel image input), each channel having a relatively large feature map, the 32-channel ML accelerator may be significantly underutilized for processing the input layer. For instance, the ML accelerator may utilize only 3 channels of the 32 total channels available, for a utilization of $3/32$ (e.g., less than 10% utilization).

ML accelerators implemented by a smartphone, mobile computing device, and/or other edge computing device can be referred to as mobile ML accelerators. Mobile ML accelerators can be implemented as specialized microprocessors for accelerating various computations associated with performing inference using an ML model executing on the smartphone or mobile computing device. For instance, ML accelerators (e.g., including mobile ML accelerators) can refer to hardware processors and/or hardware processing components that can be used to perform various ML operations and/or calculations faster than a general-purpose processor. For example, executing or running an ML model can be associated with performing particular types of operations or calculations repeatedly (e.g., such as matrix operations), and ML accelerators can perform these types of operations faster than a general-purpose processor. Examples of ML accelerators can include, but are not limited to, a DSP, GPU, NPU, etc. ML accelerators can be provided as general-purpose hardware, capable of performing acceleration for various types of ML operations and/or various ML networks and architectures. For example, a mobile ML accelerator included in a smartphone can be used to accelerate image processing, natural language processing (NLP), voice recognition, etc. Different ML operations, networks, and/or architectures can be associated with varying quantities of input channels. For example, image processing machine learning networks may utilize three-channel inputs (e.g., one red channel, one blue channel, and one green channel for an RGB image input). NLP machine learning networks may utilize inputs having dozens of channels or more. For instance, an NLP machine learning network may utilize separate channels for different word embeddings, vocabularies, phrases, etc.

Existing mobile ML accelerators are often optimized to accelerate neural networks that utilize a relatively large quantity of channels (e.g., a relatively large quantity of channels per layer, a relatively large quantity of channels for one or more hidden layers that utilize more channels and smaller feature maps than input and/or output layers of the neural network, etc.). For example, a mobile ML accelerator may be optimized to operate on inputs having 32 channels (or greater). ML models that use only a subset of the total quantity of channels associated with an ML accelerator under-utilize the mobile ML accelerator. For instance, image processing ML models (e.g., which use three input channels) and/or other relatively low-channel ML models that runs on an ML accelerator optimized for 32 channels or greater can significantly under-utilize the ML accelerator (e.g., the 3-channel input layer and any hidden layers, convolutional layers, etc. that are downstream of the input layer but use a quantity of channels less than 32 may each under-utilize the ML accelerator). There is a need for systems and techniques that can be used to improve the on-device efficiency of accelerating image processing and other relatively low-channel ML models. For example, there is a need for systems and techniques that can be used to more efficiently accelerate image processing and other relatively low-channel ML models based on utilizing all of the available input channels of an ML accelerator (e.g., a mobile ML accelerator).

Systems, apparatuses, processes (also referred to as methods), and computer-readable media (collectively referred to as "systems and techniques") are described herein for processing images (e.g., image data or video data) using channel-wise tiling of a plurality of overlapping image patches. For example, the channel-wise tiling can be performed using a tiled neural network, such as a tiled convolutional neural network (CNN), and/or can be performed using various other tiled fully convolutional machine learning architectures and/or models. A tiled neural network (e.g., such as a tiled CNN) utilizes "tiled" inputs that represent portions of a larger or overall input image to be analyzed by the tiled neural network. A larger input image can be divided into a plurality of equally-sized sections (e.g., "tiles") that may in some cases overlap at least partially. The tiled neural network can generate a corresponding prediction for each individual tile, and the individual predictions for the tiles can be combined to obtain a prediction for the larger input image. A fully convolutional machine learning model (e.g., such as a fully convolutional neural network) does not include fully-connected layers and/or performs only convolutional operations. In some cases, the plurality of overlapping image patches can be generated for a frame of image data. The frame of image data can be padded with a plurality of padding pixels around the perimeter of the frame of image data. For example, an equal number of columns and rows of padding pixels can be added around each perimeter or edge of the frame of image data to generate the padded image. In some cases, the plurality of padding pixels can be arranged symmetrically around the perimeter of the frame of image data. The plurality of overlapping image patches can each correspond to a different portion of the padded image, and may each be equally sized. Each overlapping image patch can be associated with an overlap value, wherein the overlap value is indicative of a quantity of pixel columns or pixel rows that overlap (e.g., are shared) between the overlapping image patch and a vertically or horizontally adjacent overlapping image patch. The overlap value can be determined based on a spatial input receptive field value determined for a machine learning architecture associated with the channel-wise tiled machine learning model used to perform the channel-wise tiling. Based on adjusting the overlap value relative to the spatial input receptive field value, visual artifacts at the tile boundaries of a processed output image generated by the channel-wise tiled machine learning model can be reduced or eliminated.

Various aspects of the present disclosure will be described with respect to the figures.

FIG. 1 illustrates an example implementation of a system-on-a-chip (SOC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU 102, DSP 106, and/or GPU 104. The SOC 100 may also include a sensor processor 114, image signal processors (ISPs) 116, and/or navigation module 120, which may include a global positioning system. In some examples, the sensor processor 114 can be associated with or connected to one or more sensors for providing sensor input(s) to sensor processor 114. For example, the one or more sensors and the sensor processor 114 can be provided in, coupled to, or otherwise associated with a same computing device.

The SOC 100 may be based on an ARM instruction set. In an aspect of the present disclosure, the instructions loaded into the CPU 102 may comprise code to search for a stored multiplication result in a lookup table (LUT) corresponding to a multiplication product of an input value and a filter weight. The instructions loaded into the CPU 102 may also comprise code to disable a multiplier during a multiplication operation of the multiplication product when a lookup table hit of the multiplication product is detected. In addition, the instructions loaded into the CPU 102 may comprise code to store a computed multiplication product of the input value and the filter weight when a lookup table miss of the multiplication product is detected. SOC 100 and/or components thereof may be configured to perform image processing using machine learning techniques according to aspects of the present disclosure discussed herein. For example, SOC 100 and/or components thereof may be configured to perform semantic image segmentation and/or object detection according to aspects of the present disclosure.

Machine learning (ML) can be considered a subset of artificial intelligence (AI). ML systems can include algorithms and statistical models that computer systems can use to perform various tasks by relying on patterns and inference, without the use of explicit instructions. One example of a ML system is a neural network (also referred to as an artificial neural network), which may include an interconnected group of artificial neurons (e.g., neuron models). Neural networks may be used for various applications and/or devices, such as image and/or video coding, image analysis and/or computer vision applications, Internet Protocol (IP) cameras, Internet of Things (IoT) devices, autonomous vehicles, service robots, among others.

Individual nodes in a neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as a feature map or an activation map). The weight values may initially be determined by an iterative flow of training data through the network (e.g., weight values are established during a training phase in which the network learns how to identify particular classes by their typical input data characteristics).

Different types of neural networks exist, such as convolutional neural networks (CNNs), recurrent neural networks (RNNs), generative adversarial networks (GANs), multi-layer perceptron (MLP) neural networks, transformer neural networks, among others. For instance, convolutional neural networks (CNNs) are a type of feed-forward artificial neural network. Convolutional neural networks may include collections of artificial neurons that each have a receptive field (e.g., a spatially localized region of an input space) and that collectively tile an input space. RNNs work on the principle of saving the output of a layer and feeding this output back to the input to help in predicting an outcome of the layer. A GAN is a form of generative neural network that can learn patterns in input data so that the neural network model can generate new synthetic outputs that reasonably could have been from the original dataset. A GAN can include two neural networks that operate together, including a generative neural network that generates a synthesized output and a discriminative neural network that evaluates the output for authenticity. In MLP neural networks, data may be fed into an input layer, and one or more hidden layers provide levels of abstraction to the data. Predictions may then be made on an output layer based on the abstracted data.

Deep learning (DL) is one example of a machine learning technique and can be considered a subset of ML. Many DL approaches are based on a neural network, such as an RNN or a CNN, and utilize multiple layers. The use of multiple layers in deep neural networks can permit progressively higher-level features to be extracted from a given input of raw data. For example, the output of a first layer of artificial neurons becomes an input to a second layer of artificial neurons, the output of a second layer of artificial neurons becomes an input to a third layer of artificial neurons, and so on. Layers that are located between the input and output of the overall deep neural network are often referred to as hidden layers. The hidden layers learn (e.g., are trained) to transform an intermediate input from a preceding layer into a slightly more abstract and composite representation that can be provided to a subsequent layer, until a final or desired representation is obtained as the final output of the deep neural network.

As noted above, a neural network is an example of a machine learning system, and can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can be an output of applying one or more filters, kernels, weights, or the like to an input. The nodes can include one or more weights used to indicate an importance of the nodes of one or more of the layers. In some cases, a deep learning network can have a series of many hidden layers, with early layers being used to determine simple and low-level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Figure 3:
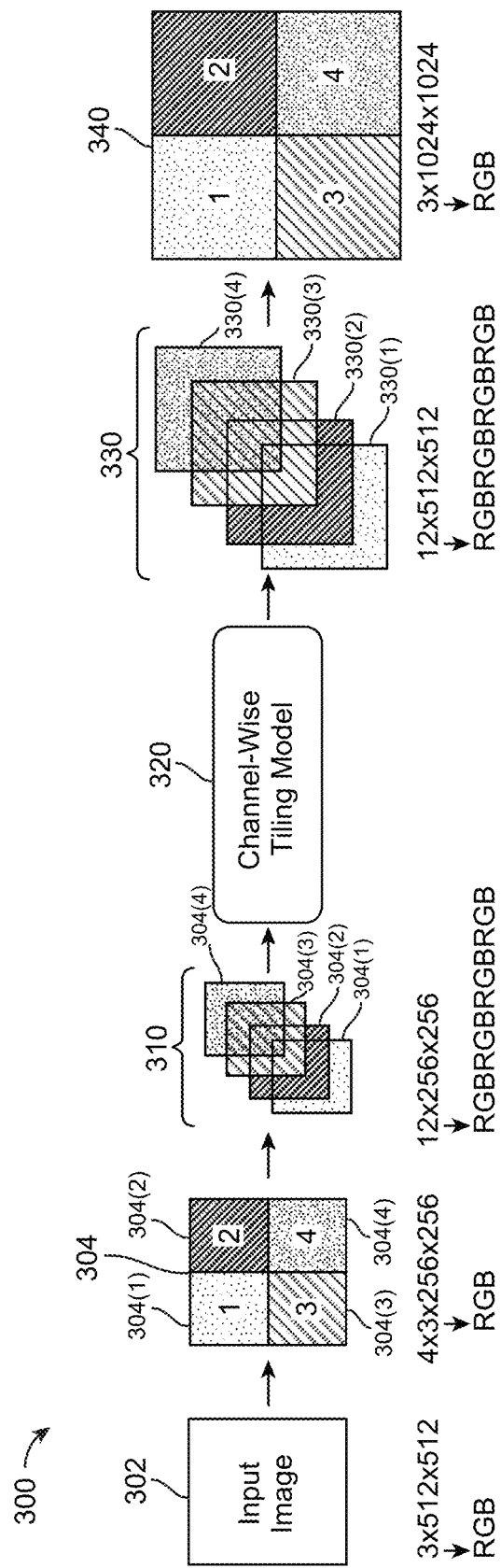
FIG. 3 illustrates an example of channel-wise tiling that can be performed using a convolutional neural network, in accordance with some examples.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence (for instance, an example of a recurrent neural network architecture is depicted in FIG. 3, described in greater depth below). A connection from a neuron in a given layer to a neuron in a lower layer is called a feedback (or top-down) connection. A network with many feedback connections may be helpful when the recognition of a high-level concept may aid in discriminating the particular low-level features of an input.

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, as the higher layer neurons in a given region may receive inputs that are tuned through training to the properties of a restricted portion of the total input to the network.

As noted previously, there is a need for systems and techniques that can be used to improve the on-device efficiency of accelerating image processing and/or other relatively low-channel ML models. There is a further need for systems and techniques that can be used to more efficiently utilize the available channels of an ML accelerator, such as when the ML accelerator is used to accelerate an image processing or other ML model that is associated with a lesser quantity of channels than the ML accelerator.

In one illustrative example, the systems and techniques described herein can be used to improve the on-device efficiency of relatively low-channel convolutional machine learning networks, such as convolutional neural networks (CNNs). In some aspects, the systems and techniques can improve the channel utilization of a CNN executing on an ML accelerator (e.g., a mobile ML accelerator) without decreasing an accuracy of the associated output of the CNN. In some examples, the systems and techniques described herein can be utilized with various CNN architectures and/or other fully convolutional architectures. For instance, the CNN or other fully convolutional machine learning architectures may be used to perform processing tasks associated with generating dense outputs. Processing tasks associated with generating dense outputs can include, but are not limited to, image processing tasks such as upscaling or super-resolution, segmentation, de-noising, etc.

As mentioned previously, existing ML accelerators (e.g., including mobile ML accelerators) are often optimized for use with machine learning networks that utilize a relatively large number of channels (e.g., such as 32 channels or more). For example, an NPU may be optimized for use with neural networks that utilize 32 channels or more. In such examples, running a relatively low-channel model on the NPU can under-utilize the available channels or the channel capacity of the NPU. Image processing neural networks can be associated with three input channels and three output channels, which may be RGB color channels (e.g., a first input channel corresponding to red color data, a second input channel corresponding to green color data, and a third input channel corresponding to blue color data; a first output channel corresponding to red color data, a second output channel corresponding to green color data, and a third output channel corresponding to blue color data). An image processing neural network that utilizes RGB image data as input may under-utilize a 32-channel NPU by up to 29 channels.

In some cases, an ML network (e.g., such as an image processing neural network) can implement channel-wise tiling to more efficiently utilize a greater quantity of channels associated with an ML accelerator (e.g., NPU). Channel-wise tiling can be performed based on splitting an input image into a plurality of equally sized patches, each patch including a different portion of the input image. The plurality of equally sized patches are stacked along the channel axis, such that the individual channels associated with each patch (e.g., the R, G, and B color data channels) are each represented using a different channel in the resulting stack of patches. The channel-wise stacked patches are then provided as input to a neural network (or other convolutional network) that includes one or more channel-wise grouped convolutional layers. In some aspects, the neural network or other convolutional network including the one or more channel-wise grouped convolutional layers may also be referred to as a "tiled" network or model.

FIG. 3 is a diagram 300 illustrating an example of channel-wise tiling that can be performed using a convolutional neural network, in accordance with some examples. An input image 302 can include a plurality of pixels of image data. The input image 302 can also be referred to as a "frame" of image data. The plurality of pixels can be associated with a resolution and a quantity of channels. The combination of the pixel resolution and the quantity of channels can be referred to as the dimensionality or spatial dimensions of the input image 302. For instance, spatial dimensions can be of the form C×H×W, where C represents the quantity of input channels, H represents the vertical pixel dimension or resolution (e.g., height), and W represents the horizontal pixel dimension or resolution (e.g., width). In the example of FIG. 3, the input image 302 can have spatial dimensions of 3×512×512, indicative of three channels (e.g., RGB color data channels), a 512-pixel horizontal pixel dimension (e.g., width of the frame of image data), and a 512-pixel vertical pixel dimension (e.g., height of the frame of image data).

A plurality of equally sized image patches 304 can be generated using the input image 302. For example, the input image 302 can be split into N image patches of size H'×W' (wherein H'<H and W'<W, for N>1). In some aspects, the quantity N of image patches can be a perfect square (e.g., 4, 9, 16, 25, 36, etc.). The image patches 304 can be generated to be non-overlapping (e.g., each image patch includes a different portion of the frame of image data 302, such that each image patch 304 includes a different subset of the plurality of pixels). For instance, given a frame of image data 302 with spatial dimensions of 3×512×512, channel-wises tiling may be performed using four non-overlapping image patches 304(1), 304(2), 304(3), 304(4) (e.g., collectively referred to as image patches 304) each having spatial dimensions of 3×256×256. Treating the set of image patches 304 as an additional channels can correspond to spatial dimensions of 4×3×256×256.

Channel-wise tiling can be implemented based on stacking the plurality of non-overlapping image patches 304 on a channel axis. By performing channel-wise stacking, spatial information of the individual image patches can be represented instead as additional channel information of a channel-wise stacked image patch 310 (e.g., the channel-wise stacked image patch 310 corresponding to stacking the image patches 304(1), 304(2), 304(3), 304(4)).

For instance, because each image patch of the image patches 304 has the same pixel resolution, a respective pixel position within one image patch has a corresponding pixel position in each of the remaining image patches 304. For example, the top-left pixel position of each image patch can be represented with the same spatial information (e.g., the top-left pixel position can be referenced as a (0,0) coordinate relative to the other pixel positions of the image patch). Using the corresponding pixel positions across the plurality of image patches 304, the RGB color channels of each image patch 304 can be represented as separate channels of the channel-wise stacked image patch 310 (e.g., stacking on the channel axis).

For example, the RGB data of the (0,0) or top-left pixel position of image patch 1 can be associated with channels 1-3 of the stacked image 310; the RGB data of the (0,0) pixel position of image patch 2 can be associated with channels 4-6 of the stacked image 310; the RGB data of the (0,0) pixel position of image patch 3 can be associated with channels 7-9 of the stacked image 310; and the RGB data of the (0,0) pixel position of image patch 4 can be associated with channels 10-12 of the stacked image 310; etc.

The channel-wise stacked image patch 310 can have spatial dimensions of N*C×H'×W'. For example, the channel-wise stacked image patch 310 illustrated in FIG. 3 may have spatial dimensions of 12×256×256. The channel-wise stacked image patch 310 and the input image 302 can include the same image data information corresponding to the plurality of pixels of the input image 302, with the channel-wise stacked image patch 310 having an increased channel dimension relative to the input image 302 and a decreased pixel resolution relative to the input image 302.

The channel-wise stacked image patch 310 can be provided as input to a machine learning model 320. The machine learning model 320 can be a tiled network or model, as noted above. For instance, the machine learning model can be a tiled neural network, such as a tiled CNN. The tiled neural network 320 can include one or more channel-wise grouped convolutional layers (e.g., such as those depicted in FIG. 4B, described below). The channel-wise grouped convolutional layers can be used to process the channel-wise stacked input 310 and generate a channel-wise stacked output 330. The channel-wise stacked output 330 can include a channel-wise stack of output image patches 330(1), 330(2), 330(3), and 330(4). Each output image patch can correspond to a respective input image patch of the channel-wise stacked image patch 310 provided as input to the machine learning model 310. For example, output image patch 330(1) can correspond to input image patch 304(1), output image patch 330(2) can correspond to input image patch 304(2), output image patch 330(3) can correspond to input image patch 304(3), output image patch 330(4) can correspond to input image patch 304(4), etc. The channel-wise stacked input 310 and the channel-wise stacked output 330 can have a same channel dimensionality (e.g., a same quantity of channels). In the example of FIG. 3, input 310 and output 330 are both associated with a channel dimensionality of 12 and include N=4 image patches having 3 channels (e.g., RGB) each.

In some examples, the un-tiled output 340 can be generated based on one or more grouped convolutions that are used to reduce the channel dimensionality and increase the spatial dimensionality of the channel-wise stacked output 330. For instance, channel-wise stacked output 330 includes 12 RGB channels and a spatial dimension of 512×512. The 12 RGB channels include four R channels (e.g., corresponding to the four output image patches 330(1)-330(4)), four G channels, and four B channels. The un-tiled output 340 can be generated by separating the 12 RGB channels of channel-wise stacked output 330 into four sets of one R, one G, and one B channel each (e.g., RGBRGBRGBRGB→[RGB] [RGB][RGB][RGB]). The four sets of individual RGB channels separated out from the 12 RGB channels of channel-wise stacked output 330 each correspond to a particular output image patch (e.g., one of the output image patches 330(1)-330(4)). The separated (e.g., un-tiled) output image patches can be combined based on the spatial arrangement and/or relationships between the corresponding input image patches, where the four 512×512 output image patches are combined into a single 1024×1024 un-tiled output 340 having three color channels (e.g., RGB). The pixel resolution of the channel-wise stacked input 310 can be the same as or different from the pixel resolution of the channel-wise stacked output 330. When the pixel resolution is constant across the channel-wise stacked input 310 and the channel-wise stacked output 330, the spatial dimensions of the un-tiled output 340 can be the same as the spatial dimensions of the un-tiled input image 302. When the pixel resolution of the channel-wise stacked output 330 is larger than the pixel resolution of the channel-wise stacked input 310, the un-tiled output 340 can have a larger spatial dimension than the un-tiled input image 302. For instance, the example of FIG. 3 can be associated with an upscaling or super-resolution image processing operation performed by the channel-wise tiling model 320, such that an input image 302 of spatial dimensions 3×512×512 is used to generate a super-resolution output image of spatial dimensions 3×1024×1024.

Figures 4A, 4B:
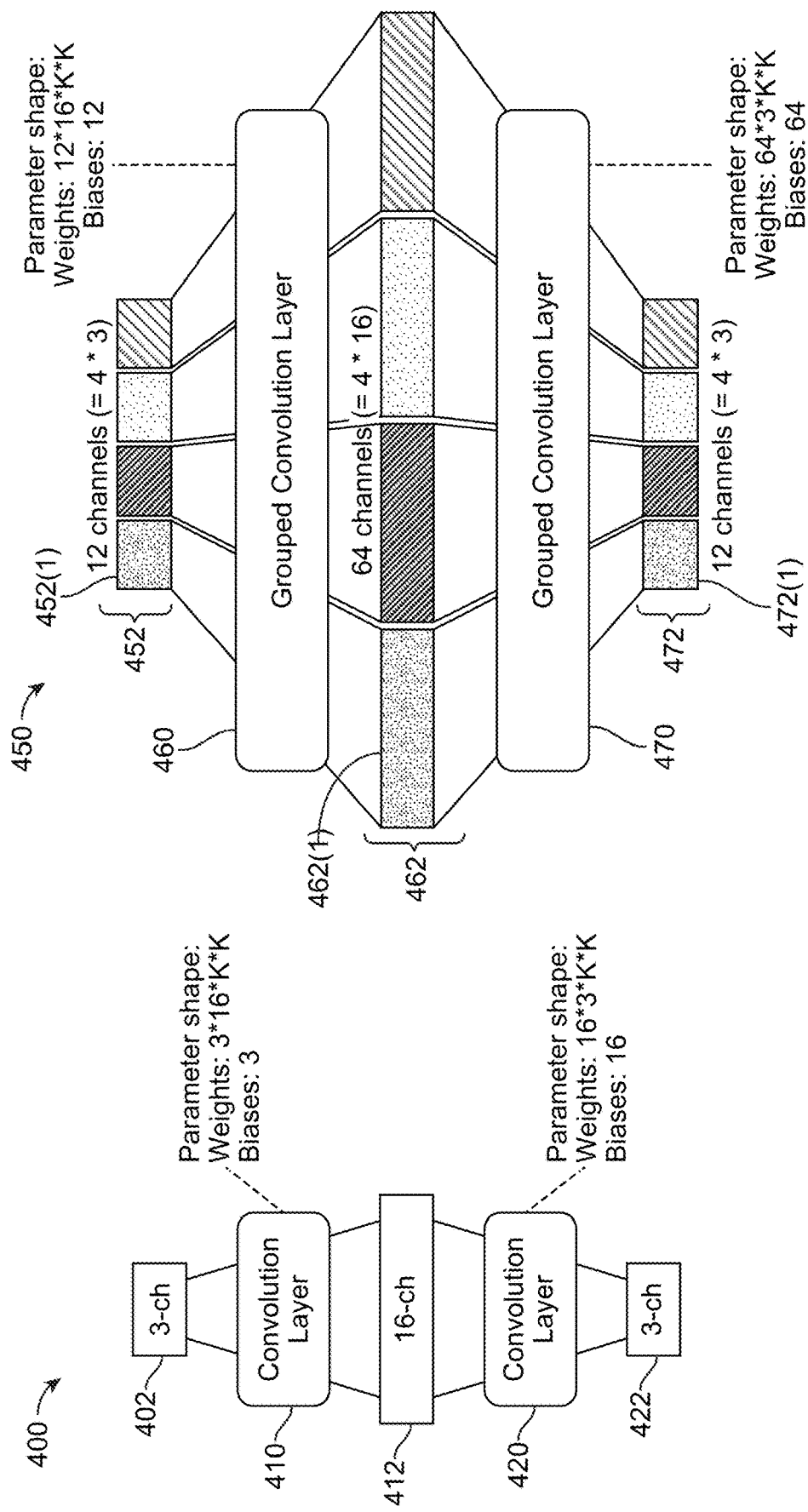
FIG. 4A illustrates an example of a convolutional neural network architecture, in accordance with some examples.
FIG. 4B illustrates an example of a tiled convolutional neural network architecture, in accordance with some examples.

FIG. 4A is a diagram illustrating an example of a convolutional neural network (CNN) architecture 400. FIG. 4B is a diagram illustrating an example of a tiled CNN architecture 450, in accordance with some examples. In some cases, the tiled CNN architecture 450 can be used to implement the channel-wise tiling model 320 of FIG. 3.

The CNN architecture 400 can be associated with a 3-channel input 402 and a 3-channel output 422. The input 402 can be provided to a first convolutional layer 410, which outputs to a 16-channel hidden layer 412. A second convolutional layer 420 can generate the 3-channel output 422 based on the 16-channel hidden layer 412. In the example CNN architecture 400, the first and second convolutional layers 410 and 420, respectively, can be associated with a parameter shape with weights 3*16*K*K and 3 biases (where K is the spatial size of the convolution kernel associated with CNN architecture 400).

The tiled CNN architecture 450 of FIG. 4B can be implemented based on the non-tiled CNN architecture 400 of FIG. 4A. A non-tiled machine learning network can be converted to a tiled machine learning network as a post-training process (e.g., a trained non-tiled ML network can be used to generate a trained tiled ML network). In some aspects, various fully convolutional machine learning architectures can be tiled. A tiled ML model generated from a trained, non-tiled ML model can be used without performing fine-tuning or re-training of the tiled ML model. For example, the weights of the tiled ML model can be determined based on (e.g., derived from) the weights of the original, non-tiled ML model.

The tiled CNN architecture 450 can be generated or otherwise implemented based on the non-tiled CNN architecture 400. The tiled CNN architecture 450 includes one or more grouped convolutional layers, shown here as a first grouped convolutional layer 460 and a second grouped convolutional layer 470. In some aspects, a tiled ML model can be generated from a non-tiled ML model by replacing the standard convolutions (e.g., convolution layers) of the non-tiled ML model with corresponding grouped convolutional layers.

The grouped convolutional layers (e.g., 460, 470) can be the same as one another. For instance, the grouped convolutional layers 460, 470 can be implemented as N×-wider grouped convolutions, where N is the quantity of groups. In one illustrative example, the quantity of groups associated with each grouped convolutional layer of the tiled model can be the same as the quantity of groups (e.g., image patches) associated with the channel-wise stacked input to the tiled model.

For example, the grouped input 452 can be a 12 channel input corresponding to splitting the 3-channel input 402 of FIG. 4A into N=4 patches with 3 RGB channels each, and stacking the patches along the channel axis. For instance, the 3-channel input 402 can be the same as or similar to the input image 302 of FIG. 3 and/or the 12-channel grouped input 452 can be the same as or similar to the channel-wise stacked input 310 of FIG. 3.

In the example of grouped input 452 including N=4 groups, the first grouped convolution layer 460 and the second grouped convolution layer 470 can implement a 4×-wider grouped convolution. The 4×-wider grouped convolution can be used to process four times more input channels than the corresponding standard convolution of FIG. 4A and can generate four times more output channels than the corresponding standard convolution of FIG. 4A. As noted previously above, channel-wise tiling can be performed using grouped convolutions, wherein each of the N groups of the grouped convolution corresponds to a respective tile of a channel-wise stacked input to the grouped convolution. For example, a first group 452(1) included in the tiled input 452 can correspond to a first image patch of the 3-channel image 402. A first group 472(1) included in the tiled output 472 can correspond to the same image patch as the input group 452(1). A first group 462(1) included in the hidden layer 462 can correspond to the first group 452(1) of tiled input 452 and can correspond to the first group 472(1) of the tiled output 472.

In some cases, grouped convolutions can be used to enforce or obtain independent processing for each image tile of the tiled input 452. For example, the first 4×-wider grouped convolution layer 460 can process a first image patch 452a independently from the three remaining image patches in the channel-wise stacked input 452, and the second 4×-wider grouped convolution layer 470 can generate the first output patch 472a independently from the three remaining output patches in the channel-wise stacked output 472 (and/or independently from the three remaining image patches in the channel-wise stacked input 452).

As illustrated in FIG. 4B, the first 4×-wider grouped convolution layer 460 can be associated with the 12-channel input 452 and the 64-channel hidden layer 462. The second 4×-wider grouped convolution layer 470 can be associated with the 64-channel hidden layer 462 and the 12-channel tiled output 472. The parameter weights and biases of the tiled CNN architecture 450 can be determined using the corresponding parameter weights and biases of the non-tiled CNN architecture 400. For instance, the weights and biases of the non-tiled CNN architecture 400 can be duplicated N times along the first dimension to obtain the weights and biases for tiled CNN architecture 450. For example, the 3*16*K*K weights (and 3 biases) associated with the first convolution layer 410 of non-tiled CNN architecture 400 can be duplicated N=4 times to obtain the 12*16*K*K parameter weights (and 12 biases) for the first 4×-wider grouped convolution layer 460 of tiled CNN architecture 450. The 16*3*K*K weights (and 16 biases) associated with the second convolution layer 420 of non-tiled CNN architecture 400 can be duplicated N=4 times to obtain the 64*3*K*K parameter weights (and 64 biases) for the second 4×-wider grouped convolution layer 470 of tiled CNN architecture 450.

In some cases, channel-wise tiling can implement grouped convolutions (e.g., such as the 4×-wider grouped convolution layers 460, 470) to process each tile (e.g., image patch) independently and without mixing channels from distinct tiles together. However, channel-wise tiling (e.g., as described with respect to FIGS. 3-4B) can introduce various artifacts, errors, inaccuracies, etc., in the resulting output generated from a channel-wise tiled input. For instance, when the channel-wise tiling model 320 of FIG. 3 and/or the tiled CNN architecture 450 of FIG. 4B is utilized to perform an image processing operation, the processed image generated as output can include one or more visual artifacts at the edges of some (or all) of the image patch edges or boundaries.

For example, a channel-wise tiling model (e.g., such as channel-wise tiling model 320 or tiled CNN 450) can generate the processed output image 340 with one or more visual artifacts introduced at the edges between adjacent image patches. In some cases, the visual artifacts associated with existing approaches to channel-wise tiling can include discontinuities in pixel color at and across the edges of some (or all) of the image patches and/or the boundaries between some (or all) of the various pairs of adjacent image patches. In some cases, the quantity of visual artifacts present in an output image generated using a channel-wise tiling model can be based on the quantity N of patches generated from the input image.

Figure 5:
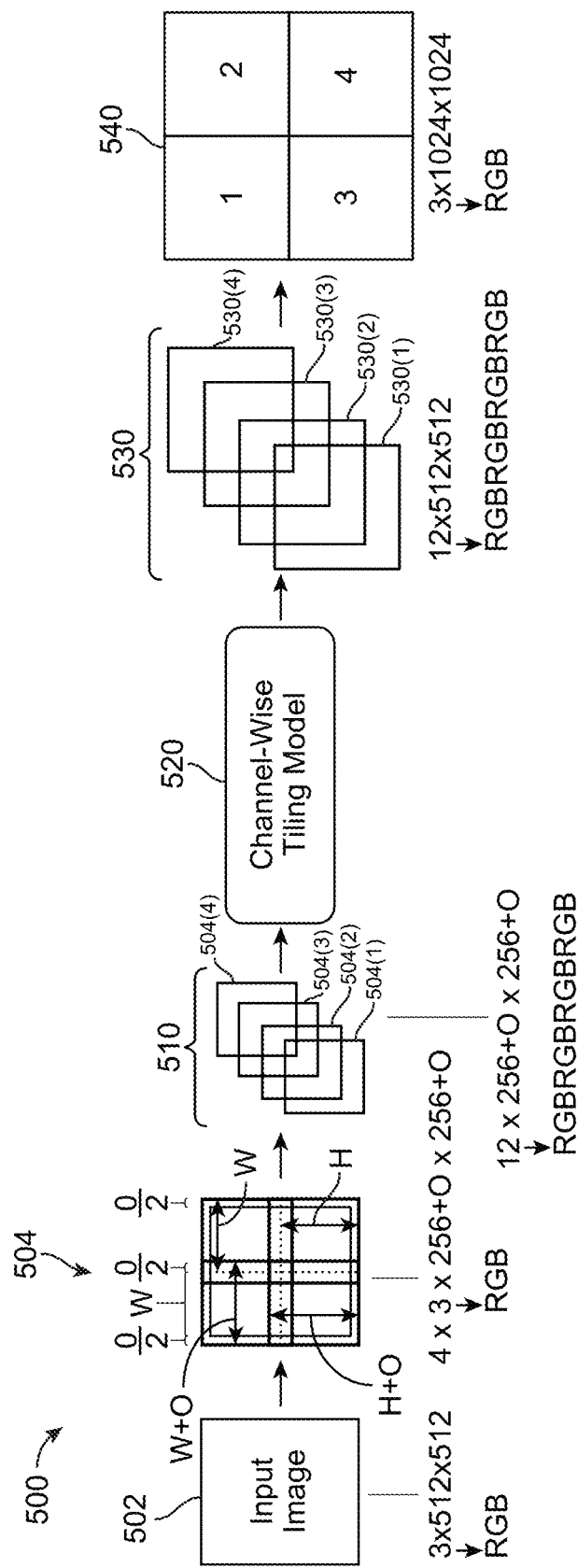
FIG. 5 illustrates an example of channel-wise tiling with adaptive overlaps that can be performed using a convolutional neural network, in accordance with some examples.

FIG. 5 illustrates an example of channel-wise tiling with adaptive overlaps 500 that can be performed using a convolutional neural network, in accordance with some examples. In one illustrative example, the systems and techniques described herein can be used to perform channel-wise input tiling with adaptive overlaps between adjacent image patches. For instance, as depicted in FIG. 5, an input image 502 can be split into a plurality of overlapping image patches 504, wherein each overlapping image patch is associated with an overlap O. In some aspects, the overlap O can be a quantity of pixels by which each respective image patch 504 overlaps with its horizontally and/or vertically adjacent image patches. For example, an overlap of O=4 can be associated with a first image patch (e.g., image patch 1 of the plurality of overlapping image patches 504) having 4 columns of overlapping pixels with a horizontally adjacent image patch (e.g., image patch 2) and having 4 rows of overlapping pixels with a vertically adjacent image patch (e.g., image patch 3).

In some examples, the input image 502 of FIG. 5 can be the same as the input image 302 of FIG. 3. For example, input image 502 can be a frame of image data comprising a plurality of pixels having a spatial resolution of 3×512×512 (e.g., as described above with respect to FIG. 3). In one illustrative example, the input image can be padded by an amount equal to the overlap O. For instance, a padded image 504 can be generated based on providing a plurality of padding pixels located around the boundary of the frame of image data 502. The plurality of padding pixels can be arranged symmetrically around the boundary of the frame of image data 502. For example, the padded image 504 can be generated by adding O/2 pixels on each of the four sides of the frame of image data 502. For O=4, two rows of padding pixels can be added to the top edge of the frame of image data 502 (e.g., the top edge of the perimeter of the frame of image data 502) and two rows of padding pixels can be added to the bottom edge of the frame of image data 502 (e.g., the bottom edge of the perimeter of the frame of image data 502). Additionally, two columns of padding pixels can be added to the left edge of the frame of image data 502 (e.g., the left edge of the perimeter of the frame of image data 502) and two columns of padding pixels can be added to the right edge of the frame of image data 502 (e.g., the right edge of the perimeter of the frame of image data 502).

In one illustrative example, the padded image 504 can be generated by zero-padding the frame of image data 502 with O/2 zero-valued pixels (e.g., '0's) along each of the four edges (e.g., the outer edges) of the frame of image data 502. For instance, the padded image 504 can be generated by zero-padding the frame of image data 502 using two or more layers of padding pixels located along each outer edge of the perimeter of the frame of image data 502. In some aspects, the plurality of padding pixels are arranged symmetrically around the perimeter of the frame of image data 502.

Based on padding with O/2 padding pixels on each side of the frame of image data 502, the padded image 504 can have a larger resolution than the frame of image data 502. For instance, given a frame of image data with spatial dimensions 3×512×512 and an overlap of O=4, the padded image 504 can have spatial dimensions 3×516×516.

The padded image 504 can be split into a plurality of overlapping image patches of size (H+O)×(W+O), wherein each overlapping image patch of the plurality of overlapping image patches has an overlap of O pixels. As illustrated in the example of FIG. 5, the padded image 504 can be split into N=4 overlapping image patches, each of spatial dimensions 3×(256+O)×(256+O). In some aspects, the quantity N of image patches 504 can be a perfect square (e.g., 4, 9, 16, 25, 36, etc.). Based on splitting the padded image 504 into the N=4 overlapping image patches, the spatial dimensions of the plurality of patches of padded image 504 can be given as 4×3×(256+O)×(256+O).

The overlap between adjacent ones of the plurality of overlapping image patches can be indicative of an overlap area that is included in each image patch of an adjacent pair of image patches. For instance, an overlap area of O=4 columns of pixels can be included in the image patch 1 and the image patch 2; an overlap area of O=4 rows of pixels can be included in the image patch 1 and the image patch 3; etc. The overlap between adjacent pairs of image patches can include pixels of the frame of image data 502 and can include pixels added during the padding (e.g., '0's added during zero-padding) of the frame of image data 502.

A channel-wise grouped input 510 (e.g., a channel-wise grouping of a first image patch 504(1), a second image patch 504(2), a third image patch 504(3), and a fourth image patch 504(4)) can be generated based on stacking the plurality of overlapping image patches (e.g., 504(1)-504(4)) along the channel axis (e.g., in a manner the same as or similar to that described above with respect to FIG. 3). The channel-wise grouped input 510 can have a spatial dimension of 12×(256+O)×(256+O). The channel-wise grouped input 510 can be provided as input to a channel-wise tiling model 520, which may be the same as or similar to the channel-wise tiling model 320 of FIG. 3.

In one illustrative example, the channel-wise tiling model 520 can include one or more grouped convolution layers without internal padding. For instance, one or more (or all) of a plurality of grouped convolution layers included in channel-wise tiling model 520 do not perform internal padding. In some aspects, the removal of internal padding from the grouped convolution layers of channel-wise tiling model 520 can be based on the increased pixel resolution of the channel-wise grouped input 510. For instance, the systems and techniques can remove internal padding performed at some (or all) of the grouped convolution layers in order to generate the channel-wise stacked output 530 (e.g., the channel-wise stack of output image patches 530(1), 530(2), 530(3), and 530(4) corresponding to input image patches 504(1), 504(2), 504(30, and 504(4), respectively) with a pixel resolution that is the same as the pixel resolution of the input image 502 or otherwise related to the pixel resolution of input image 502.

For example, FIG. 5 depicts an example of a super-resolution image processing task performed using channel-wise tiling with adaptive overlaps. To generate an output image that has a pixel resolution that is an integer multiple of the pixel resolution of the input frame of image data 502, the systems and techniques can skip or remove internal padding performed at some (or all) of the grouped convolution layers of channel-wise tiling model 520. For instance, skipping or removing internal padding at the grouped convolution layers can reduce the spatial resolution after each grouped convolution is applied in the channel-wise tiling model 520. Reducing the spatial resolution between the input and output of channel-wise tiling model 520 can be used to obtain processed outputs of a desired size, based on reducing the spatial resolution from input to output by an amount corresponding to the quantity of added input pixels due to the padding described above.

In some aspects, the channel-wise input tiling with adaptive overlaps that can be implemented using the systems and techniques described herein may be used to reduce or eliminate visual artifacts in processed output images (e.g., such as the output image 540) and/or various other dense outputs associated with tasks such as segmentation, de-noising, etc. In some examples, the output image 540 can be generated based on one or more grouped convolutions that are used to reduce the channel dimensionality and increase the spatial dimensionality of the channel-wise stacked output 530. For instance, channel-wise stacked output 530 includes 12 RGB channels and a spatial dimension of 512×512. The 12 RGB channels include four R channels (e.g., corresponding to the four output image patches 530(1)-530(4)), four G channels, and four B channels. The un-tiled output image 540 can be generated by separating the 12 RGB channels of channel-wise stacked output 530 into four sets of one R, one G, and one B channel each (e.g., RGBRGBRGBRGB→[RGB][RGB][RGB][RGB]). The four sets of individual RGB channels separated out from the 12 RGB channels of channel-wise stacked output 530 each correspond to a particular output image patch (e.g., one of the output image patches 530(1)-530(4)). The separated (e.g., un-tiled) output image patches can be combined based on the spatial arrangement and/or relationships between the corresponding input image patches, where the four 512×512 output image patches are combined into a single 1024×1024 un-tiled output image 540 having three color channels (e.g., RGB). In some aspects, reducing or eliminating visual artifacts between adjacent tiled portions of the processed output image 540 (e.g., corresponding to adjacent patches of the padded input image 504) can be based on the size of the overlap O used to generate the plurality of overlapping image patches of the padded image 504. In one illustrative example, the overlap size O can be determined based on a spatial input receptive field R associated with the machine learning architecture used to implement the channel-wise tiling model 520.

For example, the spatial input receptive field associated with a machine learning network can be indicative of the size of the region in the input that produces a feature in the output. The spatial input receptive field can be representative of the association of an output feature (of any layer) to an input region (e.g., patch). Spatial input receptive fields can be applied to local operations of the machine learning network, such as convolution, pooling, etc. For example, a machine learning convolutional unit can depend on only a local region (e.g., patch) of the input, and the size of this local region can be indicated by the spatial receptive field of the convolutional unit. Within fully-connected layers of a machine learning network, each unit has access to the entirety of the input region, and fully-connected units are not associated with a spatial input receptive field (or are associated with a spatial input receptive field that is equal to the size of the input).

In one illustrative example, the systems and techniques described herein can determine an adaptive overlap for generating the overlapping image patches for performing channel-wise input tiling. In some aspects, the overlap size O can be determined based on the spatial input receptive field R determined for the particular ML architecture used to implement the channel-wise tiling model 520. For example, when the channel-wise tiling model 520 is a single-branch convolutional architecture that does not utilize strided convolutions, the spatial input receptive field R can be determined as:

$$R = 1 + \sum_{i=1}^{D} k_i - 1 \qquad \text{Eq. (1)}$$

Here, D represents a total quantity of convolution layers of the channel-wise tiling model (e.g., channel-wise tiling model 520) and $k_i$ represents the convolution kernel size of the i-th one of the D convolution layers.

Based on the value determined for the spatial input receptive field R (e.g., using Eq. (1) or otherwise), the overlap size O can be determined. In one illustrative example, the overlap size can be determined as:

$$O = R - 1 \qquad \text{Eq. (2)}$$

In some aspects, setting the overlap size O associated with generating the plurality of overlapping image patches for the padded input image 504 equal to R−1 can guarantee the absence of tiling artifacts in the output of the channel-wise tiling model 520. In some examples, the overlap size O can be determined such that O is less than or equal to R−1 (e.g., the value of overlap size O can have an upper limit given by Eq. (2)).

In some cases, a lower value of overlap size O may be utilized, such that O<(R−1). In such examples, visual quality of the output image may decrease with lower overlap values O (e.g., due to the introduction of increasingly greater quantities of visual artifacts for lower values of O). The inference speed associated with channel-wise tiling model being used to generate the output image can increase with lower overlap values O.

In some aspects, the overlap value O can be used to determine one or more convolution layers included in channel-wise tiling model 520 at which internal padding will be skipped or removed. As noted previously, convolutional ML models may include or perform internal padding at each convolution layer, wherein the internal padding is performed by adding a set of padding pixels to the input or output of the convolution layer. Based on the systems and techniques adding padding pixels to the padded image 504 prior to its use as input to the channel-wise tiling mode, the removal of internal padding at some (or all) of the convolution layers of channel-wise tiling model 520 can be performed to obtain a final output (e.g., processed output image 540) of a correct shape and/or spatial resolution.

Figures 6A, 6B:
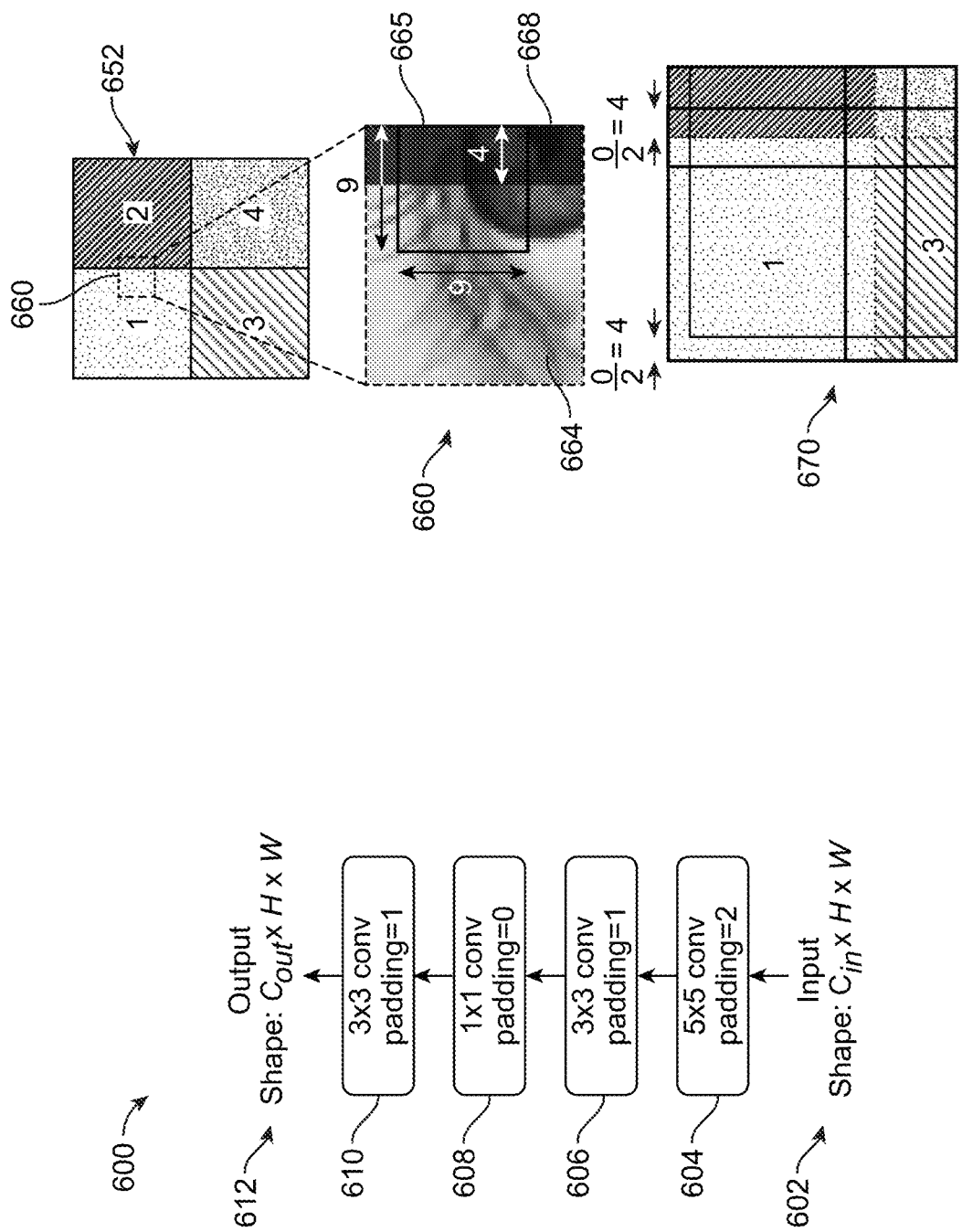
FIG. 6A illustrates an example of a convolutional neural network architecture that implements internal padding at one or more convolutional layers, in accordance with some examples.
FIG. 6B illustrates an example of a spatial input receptive field associated with channel-wise tiling, in accordance with some examples.

FIG. 6A illustrates an example of a convolutional neural network architecture 600 that implements internal padding at one or more convolution layers. In the example of a CNN model with a single branch of successive convolution layers (e.g., 605, 606, 608, 610), the convolution layers can perform internal padding with internal padding parameters set to $$\frac{k_i - 1}{2},$$

such that the spatial resolution of the input 602 is the same as the spatial resolution of the output 612.

For example, input 602 can be of shape (e.g., spatial dimension or resolution) $C_{in} \times H \times W$. Internal padding with internal padding parameters set to $$\frac{k_i - 1}{2}$$

can be used at the convolution layers 604-610 to generate output 612 with shape $C_{out} \times H \times W$, wherein the spatial resolution is unchanged. In some cases, internal padding to obtain an output spatial resolution that is unchanged from an input spatial resolution may also be referred to as "same" padding.).

Internal padding at a convolution layer can be performed based on padding one or more pixels on each side of an input tensor to the convolution layer, before applying the convolution. For instance, a first convolution layer 604 can be a 5×5 convolution with $k_1=5$. The corresponding internal padding parameter is 2 (e.g., based on $$\frac{k_i - 1}{2}).$$

First convolution layer 604 can apply internal padding with padding=2 by padding two pixels on each side of the input 602 tensor before applying the convolution.

Second convolution layer 606 can be a 3×3 convolution with $k_2=3$ and padding=1, internal padding can be performed by padding one pixel on each side of the input tensor to second convolution layer 606 (which is the same as the output tensor from first convolution layer 604).

FIG. 6B illustrates an example of a spatial input receptive field associated with channel-wise tiling, in accordance with some examples. A plurality of non-overlapping image patches 652 are depicted, and may be the same as or similar to the plurality of non-overlapping image patches 304 of FIG. 3. A spatial input receptive field 660 is shown as the pixel area of the input (e.g., non-overlapping image patches 652) that corresponds to a particular pixel of the output (e.g., processed output image 660).

Using Eq. (1), above, to determine the spatial input receptive field R for the example CNN 600 of FIG. 6A gives:

$$R = 1 + \sum_{i=1}^{4} k_i - 1 \qquad \text{Eq. (3)}$$
$$= 1 + 4 + 2 + 0 + 2 = 9$$

A value of R=9 corresponds to a 9×9 pixel dimension of the spatial input receptive field and is indicative of each output pixel being influenced by a 9×9 window of input pixels, as shown by the spatial input receptive field 665 overlaid on the output image 660. Here, the output pixel influenced by the 9×9 spatial input receptive field 665 is located at the center of the 9×9 window (e.g., assigning the bottom left pixel of the 9×9 window to the (0,0) coordinate, the output pixel associated with spatial input receptive field 665 is located at the (4,4) coordinate). In some cases, the output pixel influenced by and located in the center of the 9×9 window of the spatial input receptive field 665 can be the same as or similar to an output pixel located in the center of a convolutional window (e.g., convolution kernel).

As illustrated in FIG. 6B, when adjacent image patches generated for the input image 652 are non-overlapping (e.g., as in FIG. 3), visual artifacts can be introduced at the edges (e.g., along the perimeter) of each tile in the output image 660 based on channel-wise tiling models (e.g., such as channel-wise tiling model 320 and/or 520) processing each tile/image patch independently.

For instance, patch 1 and patch 2 of the input image 652 are processed independently by a channel-wise tiling model, because each patch is treated as a separate and independent group to a grouped convolution (e.g., such as the grouped convolution layers 460, 470 of FIG. 4B).

As depicted in FIG. 6B, a first tile 664 of output image 660 corresponds to patch 1 of input image 652, and a second tile 668 of output image 660 corresponds to patch 2 of input image 652. Because each image patch is treated as a separate and independent group to a grouped convolution layer of a channel-wise tiling model, an output pixel located on the boundary between tile 664 and tile 668 of the output image 660 corresponds to a spatial input receptive field 665 that is missing (e.g., unable to access) one or more rows or columns of input pixels that would have influenced the output pixel. For example, the spatial input receptive field 665 is missing the four columns of pixels that are located immediately to the right of tile 664 (e.g., within tile 668).

In one illustrative example, the systems and techniques described herein can use the spatial input receptive field R to generate a padded image that is split into a plurality of overlapping image patches having an overlap size O that adds back some or all of the otherwise missing pixels to the spatial input receptive fields of output pixels located near an edge (e.g., perimeter) of a tile.

For example, a portion 670 of a padded image with overlapping image patches depicts an overlap area of O=8 pixels between patch 1 and patch 2. The overlap O=8 can be determined as in Eq. (3) above. One half of the overlap comprises 4 columns (e.g., O/2=4) of pixels obtained from patch 1, the second half of the overlap comprises 4 columns of pixels obtained from patch 2. The overlap pixels are included in both the overlapping patch 1 and the overlapping patch 2. The spatial input receptive field 665 for the output pixel at the tile boundary shown in 660 can be fully populated based on the 4 columns of overlap pixels obtained from patch 2 being included in the first overlapping patch. Based on the spatial input receptive field 665 being fully populated for the output pixels at tile boundaries (e.g. based on using O=R−1), the systems and techniques can generate processed output images without visual artifacts that may otherwise be associated with channel-wise tiling model 520.

Figures 7A, 7B:
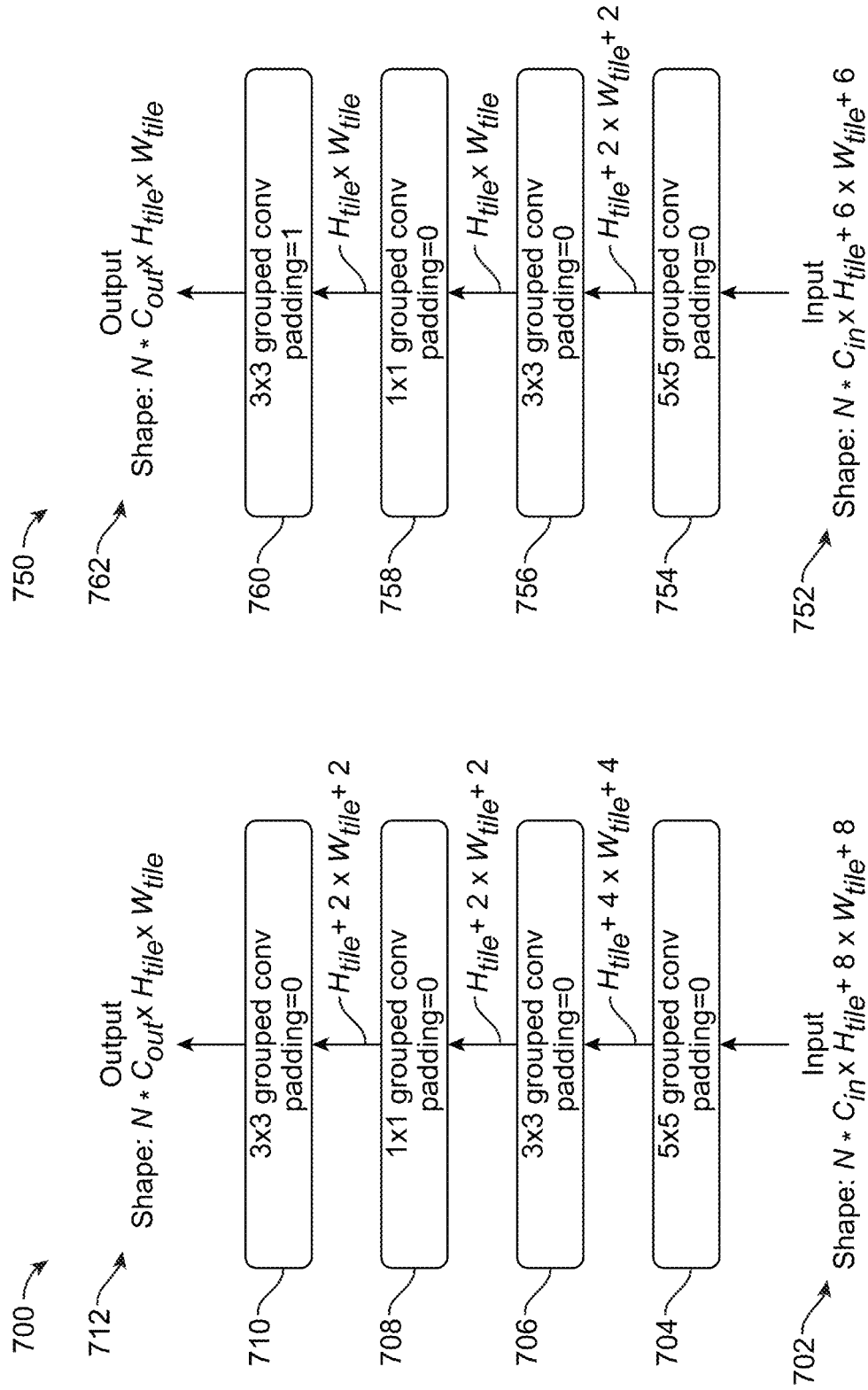
FIG. 7A illustrates an example of a tiled convolutional neural network architecture without internal padding, in accordance with some examples.
FIG. 7B illustrates another example of a tiled convolutional neural network architecture that includes at least one convolutional layer with internal padding, in accordance with some examples.

FIG. 7A illustrates an example of a tiled convolutional neural network architecture 700 without internal padding, in accordance with some examples. Continuing in the example of FIG. 6B above, with O=8 based on R=9, an input tensor 702 has a shape (e.g., spatial resolution) of $(N*C_{in})\times(H_{tile}+8)\times(W_{tile}+8)$.

A first grouped convolution layer 704 can be a 5×5 grouped convolution layer and may correspond to the 5×5 convolution layer 604 of FIG. 6A. For example, the 5×5 convolution layer 604 of FIG. 6A can be modified to obtain the 5×5 grouped convolution layer 704 of FIG. 7A in a same or similar manner as described with respect to modifications between the convolution layers of FIG. 4A and the grouped convolution layers of FIG. 4B.

Similarly, a second grouped convolution layer 706 can be a 3×3 grouped convolution layer corresponding to the 3×3 convolution layer 606 of FIG. 6A; a third grouped convolution layer 708 can be a 1×1 grouped convolution layer corresponding to the 1×1 convolution layer 608 of FIG. 6A; and a fourth grouped convolution layer 710 can be a 4×4 grouped convolution layer corresponding to the 4×4 convolution layer 610 of FIG. 6A.

In the example of an overlap size O=R−1 (e.g., such as O=8 for R=9), each of the grouped convolution layers 704-710 included in the tiled CNN 700 can be implemented without performing internal padding.

Without internal padding, the tiled CNN 700 can compensate for the added input pixels included in the input 702 (e.g., the 8 added rows/columns). Without internal padding at the grouped convolution layers 704-710, the spatial resolution decreases after each grouped convolution layer is applied. In some aspects, the spatial resolution decrement between grouped convolution layers can depend on the kernel size(s) of the respective grouped convolution layers. As illustrated in FIG. 7B, the spatial resolution can decrement from the input 702 spatial resolution of $(N*C_{in})\times(H_{tile}+8)\times(W_{tile}+8)$, to $(H_{tile}+4)\times(W_{tile}+4)$ after the 5×5 grouped convolution layer 704, to $(H_{tile}+2)\times(W_{tile}+2)$ after the 3×3 grouped convolution layer 706, to $(H_{tile}+2)\times(W_{tile}+2)$ after the 1×1 grouped convolution layer 708, to $H_{tile}\times W_{tile}$ after the final 3×3 grouped convolution layer 710 that generates the output 712.

In one illustrative example, the systems and techniques can skip internal padding at one or more (or all) of the grouped convolution layers included in a channel-wising tiling model (e.g., channel-wise tiling model 320 of FIG. 3 and/or channel-wise tiling model 520 of FIG. 5) to decrement a spatial resolution until the spatial resolution of the output 712 matches the spatial resolution that would otherwise be obtained using channel-wise tiling without overlapping image patches.

FIG. 7B illustrates another example of a tiled convolutional neural network architecture 750 that includes at least one convolutional layer with internal padding, in accordance with some examples. In this example, the overlap size O can be selected such that O<R−1 (e.g., as compared to the example of O=R−1 associated with FIG. 7A). For O<R−1, a first subset of grouped convolution layers can skip implementing internal padding and a second subset of grouped convolution layers can implement internal padding, to again successively decrement and/or increment a spatial resolution associated with the CNN architecture 750 until the spatial resolution of the output 762 matches the spatial resolution that would otherwise be obtained using channel-wise tiling without overlapping image patches.

In one illustrative example, for O=6, the input 752 shape can be $(N*C_{in})\times(H_{tile}+6)\times(W_{tile}+6)$. The 5×5 grouped convolution 754, 3×3 grouped convolution 756, and 1×1 grouped convolution 758 do not apply internal padding and the final 3×3 grouped convolution 760 applies internal padding with padding=1.

Figure 8:
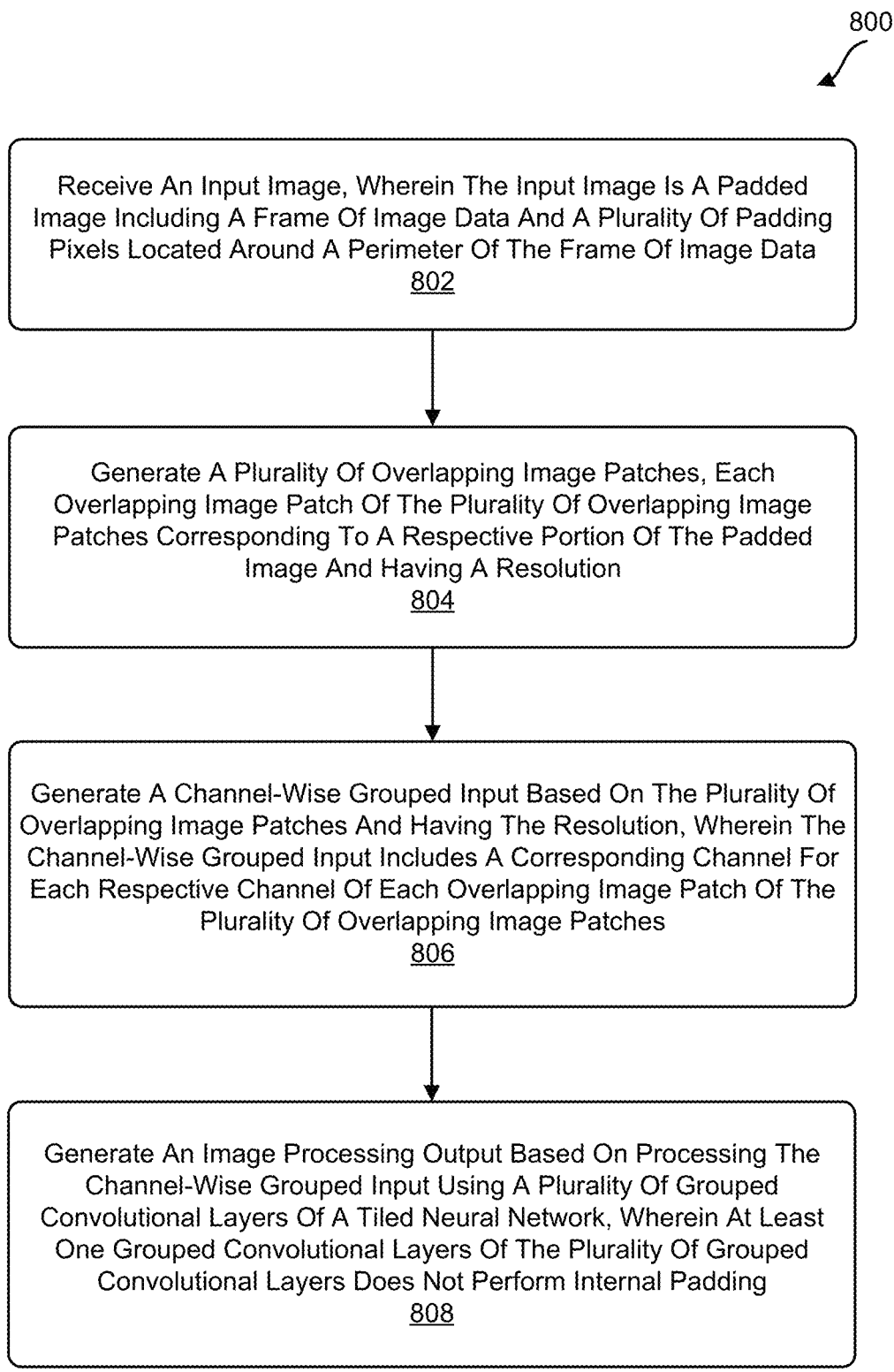
FIG. 8 is a flow diagram illustrating an example of a process for processing image and/or video data, in accordance with some examples.

FIG. 8 is a flowchart illustrating an example of a process 800 for processing image data. Although the example process 800 depicts a particular sequence of operations, the sequence may be altered without departing from the scope of the present disclosure. For example, some of the operations depicted may be performed in parallel or in a different sequence that does not materially affect the function of the process 800. In other examples, different components of an example device or system that implements the process 800 may perform functions at substantially the same time or in a specific sequence.

At block 802, the process 800 includes receiving an input image, wherein the input image is a padded image including a frame of image data and a plurality of padding pixels located around a perimeter of the frame of image data. For example, the padded image can be the same as or similar to the padded image 504 of FIG. 5. The frame of image data can be the same as or similar to the input image 302 of FIG. 3 and/or the input image 502 of FIG. 5.

In some cases, generating the padded image comprises zero-padding the frame of image data using two or more layers of padding pixels located along each outer edge of the perimeter of the frame of image data. For example, two or more layers of padding pixels can be used to zero-pad the frame of image data 502 of FIG. 5 along an upper outer edge of the perimeter of the frame of image data, a bottom outer edge of the perimeter of the frame of image data, a left outer edge of the perimeter of the frame of image data, and a right outer edge of the perimeter of the frame of image data. In some cases, the plurality of padding pixels are arranged symmetrically around the perimeter of the frame of image data. In some cases, the padded image is zero-padded.

At block 804, the process 800 includes generating a plurality of overlapping image patches, each overlapping image patch of the plurality of overlapping image patches corresponding to a respective portion of the padded image and having a resolution. For example, the plurality of overlapping image patches can be the same as or similar to the plurality of overlapping image patches of FIG. 5. Each image patch of the plurality of overlapping image patches can have the same resolution.

In some cases, the plurality of overlapping image patches are associated with an overlap pixel dimension indicative of an overlap between adjacent overlapping image patches. For example, the plurality of overlapping image patches can be associated with an overlap pixel dimension O as depicted in FIG. 5.

In some examples, the plurality of overlapping image patches can be generated by generating a first image patch corresponding to a first portion of the padded image, and generating a horizontally overlapping image patch corresponding to a second portion of the padded image and including four or more columns of pixels included in the first image patch. For example, the first image patch can be the same as or similar to the image patch '1' of the upper-left of the padded image 504 of FIG. 5. The horizontally overlapping image patch can be the same as or similar to the image patch '2' of the upper-right of the padded image 504 of FIG. 5. A vertically overlapping image patch can be generated corresponding to a third portion of the padded image and including four or more rows of pixels included in the first image patch. For example, the vertically overlapping image patch can be the same as or similar to the image patch '3' of the bottom-left of the padded image 504 of FIG. 5.

In some cases, the overlap pixel dimension (e.g., the overlap pixel dimension O of FIG. 5) comprises a quantity of overlapping rows of pixels or a quantity of overlapping columns of pixels associated with the overlap between adjacent overlapping image patches. In some examples, the plurality of overlapping image patches are associated with a horizontal pixel dimension and a vertical pixel dimension that are the same for each respective overlapping image patch of the plurality of overlapping image patches.

For instance, the plurality of overlapping image patches of FIG. 5 are each associated with a horizontal pixel dimension of 256+O. The plurality of overlapping image patches of FIG. 5 are additionally each associated with a vertical pixel dimension of 256+O. In some examples, a horizontal resolution of each overlapping image patch comprises a sum of the horizontal pixel dimension and the overlap pixel dimension and a vertical resolution of each overlapping image patch comprises a sum of the vertical pixel dimension and the overlap pixel dimension.

In some examples, the overlap pixel dimension is greater than a padding dimension associated with the padded image. For example, the overlap pixel dimension O of FIG. 5 can be greater than the padding dimension (e.g., quantity of padding rows or padding columns added to each respective edge of the perimeter of the frame of image data 502). In some cases, the overlap pixel dimension is two times the padding dimension.

At block 806, the process 800 includes generating a channel-wise grouped input based on the plurality of overlapping image patches and having the resolution, wherein the channel-wise grouped input includes a corresponding channel for each respective channel of each overlapping image patch of the plurality of overlapping image patches.

For example, the channel-wise grouped input can be the same as or similar to the channel-wise grouped input 510 of FIG. 5. The resolution of the channel-wise grouped input can be the same as the resolution of the padded image. For instance, the resolution of channel-wise grouped input 510 and the resolution of padded image 504 of FIG. 5 is (256+O)×(256+O). The corresponding channel for each respective channel of each overlapping image patch of the plurality of overlapping image patches can comprise one channel for each of the color channels of each overlapping image patch. For example, four overlapping image patches each having three color channels can be associated with a total of twelve (e.g., 3*4) corresponding channels in the channel-wise grouped input.

In some cases, each overlapping image patch of the plurality of overlapping image patches is associated with three RGB color data channels and the channel-wise grouped input includes a corresponding three RGB color data channels for each overlapping image patch of the plurality of overlapping image patches.

At block 808, the process 800 includes generating an image processing output based on processing the channel-wise grouped input using a plurality of grouped convolutional layers of a tiled neural network, wherein at least one grouped convolutional layer of the plurality of grouped convolutional layers does not perform internal padding. For example, the image processing output can be the same as or similar to the image processing output 540 of FIG. 5. In some cases, the image processing output can be based on one or more of the output 612 of FIG. 6A, the output 712 of FIG. 7A, and/or the output 762 of FIG. 7B.

The plurality of grouped convolutional layers can be the same as or similar to the plurality of grouped convolutional layers 704-710 of FIG. 7A and/or the plurality of grouped convolutional layers 754-760 of FIG. 7B. The at least one grouped convolutional layer that does not perform internal padding can be associated with a padding=0 parameter. For example, the at least one grouped convolutional layer that does not perform internal padding can be the same as or similar to one of the grouped convolutional layers 704-710 and/or 754-758 of FIGS. 7A and 7B, respectively.

In some examples, the plurality of grouped convolutional layers are included in a channel-wise input tiled neural network. For example, the channel-wise input tiled neural network can be the same as or similar to the channel-wise tiling model 520 of FIG. 5. In some cases, the channel-wise input tiled neural network can be the same as or similar to the channel-wise tiling model 320 of FIG. 3.

In some examples, a spatial input receptive field associated with the tiled neural network can be determined. For example, a spatial input receptive field associated with the tiled neural network 520 of FIG. 5 can be determined. In some cases, the overlap pixel dimension used to generate the plurality of overlapping image patches from the padded image 504 of FIG. 5 can be determined based on the spatial input receptive field. For example, the overlap pixel dimension can be less than the spatial input receptive field associated with the tiled neural network. In some cases, the spatial input receptive field can be determined based on a quantity of grouped convolutional layers included in the plurality of grouped convolutional layers and a respective convolution kernel size associated with each grouped convolutional layer.

For example, the spatial input receptive field can be determined based on a quantity of grouped convolutional layers included in the plurality of grouped convolutional layers 700 of FIG. 7A and/or a quantity of grouped convolutional layers included in the plurality of grouped convolutional layers 750 of FIG. 7B. In some cases, the convolution kernel size associated with each layer can be indicative of a size or dimension of the convolutional applied by the layer. For example, grouped convolutional layers 704 and 754 (e.g., of FIGS. 7A and 7B, respectively) have a convolution kernel size of 5, grouped convolutional layers 706, 710 and 756, 760 (e.g., of FIGS. 7A and 7B, respectively) have a convolution kernel size of 3, etc.

In some cases, the overlap pixel dimension is less than or equal to the spatial input receptive field minus one. In some examples, the overlap pixel dimension is equal to the spatial input receptive field minus one and each grouped convolutional layer of the plurality of grouped convolutional layers does not perform internal padding.

In some cases, the overlap pixel dimension is less than the spatial input receptive field minus one and a quantity of grouped convolutional layers of the plurality of grouped convolutional layers used to perform internal padding is based on a difference between the overlap pixel dimension and the spatial input receptive field.

In some examples, the processes described herein (e.g., process 800, and/or any other process described herein) may be performed by a computing device, apparatus, or system. In one example, the process 800 can be performed by a computing device or system having the computing device architecture 900 of FIG. 9. The computing device, apparatus, or system can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a laptop computer, a smart television, a camera, and/or any other computing device with the resource capabilities to perform the processes described herein, including the process 800 and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 800 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 800 and/or any other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
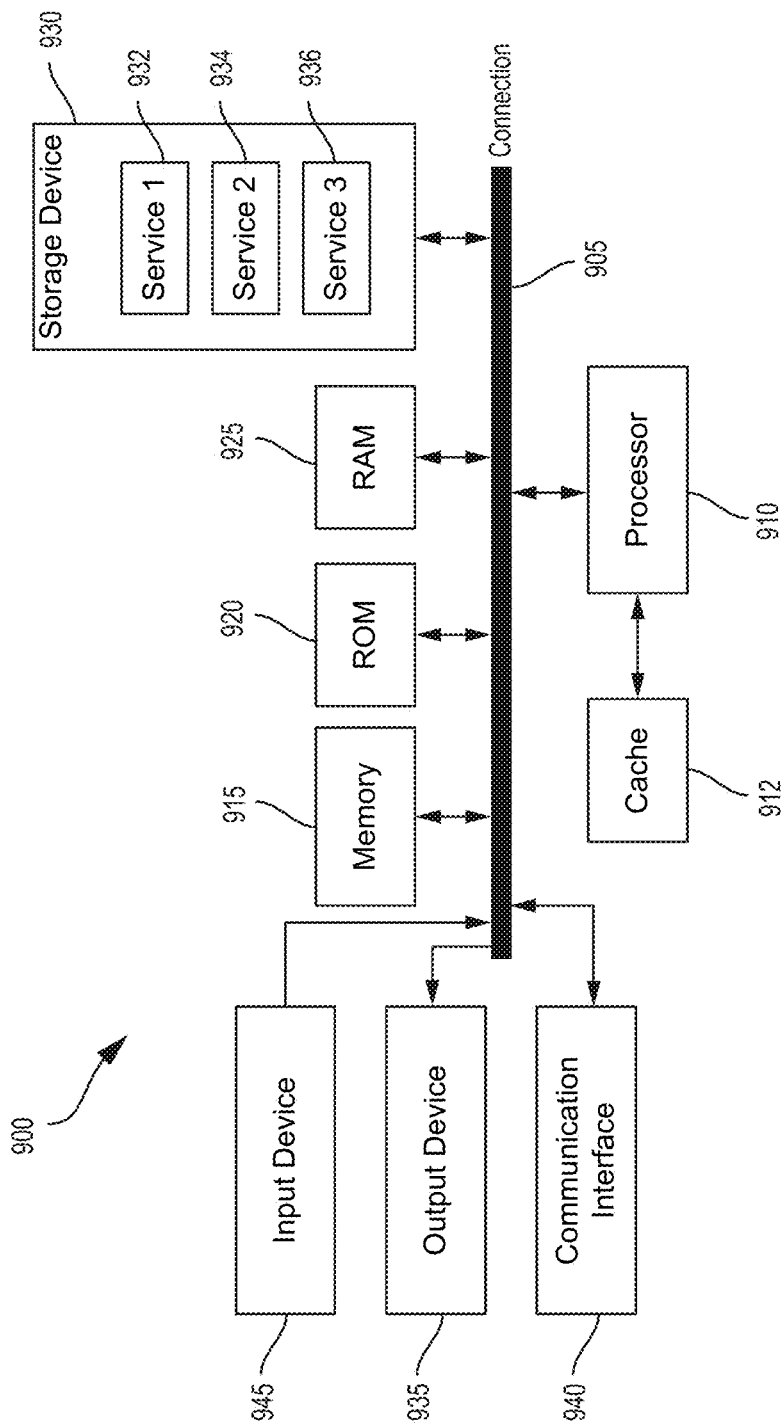
FIG. 9 is a block diagram illustrating an example of a computing system for implementing certain aspects described herein.

FIG. 9 illustrates an example computing device architecture 900 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. The components of computing device architecture 900 are shown in electrical communication with each other using connection 905, such as a bus. The example computing device architecture 900 includes a processing unit (CPU or processor) 910 and computing device connection 905 that couples various computing device components including computing device memory 915, such as read only memory (ROM) 920 and random-access memory (RAM) 925, to processor 910.

Computing device architecture 900 can include a cache of high-speed memory connected directly with, in close proximity to, or integrated as part of processor 910. Computing device architecture 900 can copy data from memory 915 and/or the storage device 930 to cache 912 for quick access by processor 910. In this way, the cache can provide a performance boost that avoids processor 910 delays while waiting for data. These and other engines can control or be configured to control processor 910 to perform various actions. Other computing device memory 915 may be available for use as well. Memory 915 can include multiple different types of memory with different performance characteristics. Processor 910 can include any general-purpose processor and a hardware or software service, such as service 1 932, service 2 934, and service 3 936 stored in storage device 930, configured to control processor 910 as well as a special-purpose processor where software instructions are incorporated into the processor design. Processor 910 may be a self-contained system, containing multiple cores or processors, a bus, memory controller, cache, etc. A multi-core processor may be symmetric or asymmetric.

To enable user interaction with the computing device architecture 900, input device 945 can represent any number of input mechanisms, such as a microphone for speech, a touch-sensitive screen for gesture or graphical input, keyboard, mouse, motion input, speech and so forth. Output device 935 can also be one or more of a number of output mechanisms known to those of skill in the art, such as a display, projector, television, speaker device, etc. In some instances, multimodal computing devices can enable a user to provide multiple types of input to communicate with computing device architecture 900. Communication interface 940 can generally govern and manage the user input and computing device output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof. Storage device 930 can include services 932, 934, 936 for controlling processor 910. Other hardware or software modules or engines are contemplated. Storage device 930 can be connected to the computing device connection 905. In one aspect, a hardware module that performs a particular function can include the software component stored in a computer-readable medium in connection with the necessary hardware components, such as processor 910, connection 905, output device 935, and so forth, to carry out the function.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, an engine, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, engines, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. An apparatus for processing image data, comprising: at least one memory; and at least one processor coupled to the at least one memory, the at least one processor configured to: receive an input image, wherein the input image is a padded image including a frame of image data and a plurality of padding pixels located around a perimeter of the frame of image data; generate a plurality of overlapping image patches, each overlapping image patch of the plurality of overlapping image patches corresponding to a respective portion of the padded image and having a resolution; generate a channel-wise grouped input based on the plurality of overlapping image patches and having the resolution, wherein the channel-wise grouped input includes a corresponding channel for each respective channel of each overlapping image patch of the plurality of overlapping image patches; and generate an image processing output based on processing the channel-wise grouped input using a plurality of grouped convolutional layers of a tiled neural network, wherein at least one grouped convolutional layer of the plurality of grouped convolutional layers does not perform internal padding.

Aspect 2. The apparatus of Aspect 1, wherein: the plurality of overlapping image patches are associated with an overlap pixel dimension indicative of an overlap between adjacent overlapping image patches.

Aspect 3. The apparatus of Aspect 2, wherein the at least one processor is further configured to: determine a spatial input receptive field associated with the tiled neural network; and determine the overlap pixel dimension based on the spatial input receptive field, wherein the overlap pixel dimension is less than the spatial input receptive field.

Aspect 4. The apparatus of Aspect 3, wherein the spatial input receptive field is based on a quantity of grouped convolutional layers included in the plurality of grouped convolutional layers and a respective convolution kernel size associated with each grouped convolutional layer.

Aspect 5. The apparatus of any of Aspects 3 to 4, wherein the overlap pixel dimension is less than or equal to the spatial input receptive field minus one.

Aspect 6. The apparatus of any of Aspects 3 to 5, wherein: the overlap pixel dimension is equal to the spatial input receptive field minus one; and each grouped convolutional layer of the plurality of grouped convolutional layers does not perform internal padding.

Aspect 7. The apparatus of any of Aspects 3 to 6, wherein: the overlap pixel dimension is less than the spatial input receptive field minus one; and a quantity of grouped convolutional layers of the plurality of grouped convolutional layers used to perform internal padding is based on a difference between the overlap pixel dimension and the spatial input receptive field.

Aspect 8. The apparatus of any of Aspects 2 to 7, wherein the overlap pixel dimension comprises a quantity of overlapping rows of pixels or a quantity of overlapping columns of pixels associated with the overlap between adjacent overlapping image patches.

Aspect 9. The apparatus of any of Aspects 2 to 8, wherein the plurality of overlapping image patches are associated with a horizontal pixel dimension and a vertical pixel dimension that are the same for each respective overlapping image patch of the plurality of overlapping image patches.

Aspect 10. The apparatus of Aspect 9, wherein: a horizontal resolution of each overlapping image patch comprises a sum of the horizontal pixel dimension and the overlap pixel dimension; and a vertical resolution of each overlapping image patch comprises a sum of the vertical pixel dimension and the overlap pixel dimension.

Aspect 11. The apparatus of any of Aspects 2 to 10, wherein the overlap pixel dimension is greater than a padding dimension associated with the padded image.

Aspect 12. The apparatus of Aspect 11, wherein the overlap pixel dimension is two times the padding dimension.

Aspect 13. The apparatus of any of Aspects 1 to 12, wherein, to generate the padded image, the at least one processor is configured to: zero-pad the frame of image data using two or more layers of padding pixels located along each outer edge of the perimeter of the frame of image data.

Aspect 14. The apparatus of Aspect 13, wherein, to generate the plurality of overlapping image patches, the at least one processor is configured to: generate a first image patch corresponding to a first portion of the padded image; generate a horizontally overlapping image patch corresponding to a second portion of the padded image and including four or more columns of pixels included in the first image patch; and generate a vertically overlapping image patch corresponding to a third portion of the padded image and including four or more rows of pixels included in the first image patch.

Aspect 15. The apparatus of any of Aspects 1 to 14, wherein: each overlapping image patch of the plurality of overlapping image patches is associated with three RGB color data channels; and the channel-wise grouped input includes a corresponding three RGB color data channels for each overlapping image patch of the plurality of overlapping image patches.

Aspect 16. The apparatus of any of Aspects 1 to 15, wherein the plurality of grouped convolutional layers are included in a channel-wise input tiled neural network.

Aspect 17. The apparatus of any of Aspects 1 to 16, wherein the plurality of padding pixels are arranged symmetrically around the perimeter of the frame of image data.

Aspect 18. The apparatus of any of Aspects 1 to 17, wherein the padded image is zero-padded.

Aspect 19. A method for processing image data, comprising: receiving a padded image including a frame of image data and a plurality of padding pixels located around a perimeter of the frame of image data; generating a plurality of overlapping image patches, each overlapping image patch of the plurality of overlapping image patches corresponding to a respective portion of the padded image and having a resolution; generating a channel-wise grouped input based on the plurality of overlapping image patches and having the resolution, wherein the channel-wise grouped input includes a corresponding channel for each respective channel of each overlapping image patch of the plurality of overlapping image patches; and generating an image processing output based on processing the channel-wise grouped input using a plurality of grouped convolutional layers of a tiled neural network, wherein at least one grouped convolutional layer of the plurality of grouped convolutional layers does not perform internal padding.

Aspect 20. The method of Aspect 19, wherein: the plurality of overlapping image patches are associated with an overlap pixel dimension indicative of an overlap between adjacent overlapping image patches.

Aspect 21. The method of Aspect 20, further comprising: determining a spatial input receptive field associated with the tiled neural network; and determining the overlap pixel dimension based on the spatial input receptive field, wherein the overlap pixel dimension is less than the spatial input receptive field.

Aspect 22. The method of Aspect 21, wherein the spatial input receptive field is based on a quantity of grouped convolutional layers included in the plurality of grouped convolutional layers and a respective convolution kernel size associated with each grouped convolutional layer.

Aspect 23. The method of any of Aspects 21 to 22, wherein the overlap pixel dimension is less than or equal to the spatial input receptive field minus one.

Aspect 24. The method of any of Aspects 21 to 23, wherein: the overlap pixel dimension is equal to the spatial input receptive field minus one; and each grouped convolutional layer of the plurality of grouped convolutional layers does not perform internal padding.

Aspect 25. The method of any of Aspects 21 to 24, wherein: the overlap pixel dimension is less than the spatial input receptive field minus one; and a quantity of grouped convolutional layers of the plurality of grouped convolutional layers used to perform internal padding is based on a difference between the overlap pixel dimension and the spatial input receptive field.

Aspect 26. The method of any of Aspects 20 to 25, wherein the overlap pixel dimension comprises a quantity of overlapping rows of pixels or a quantity of overlapping columns of pixels associated with the overlap between adjacent overlapping image patches.

Aspect 27. The method of any of Aspects 20 to 26, wherein the plurality of overlapping image patches are associated with a horizontal pixel dimension and a vertical pixel dimension that are the same for each respective overlapping image patch of the plurality of overlapping image patches.

Aspect 28. The method of Aspect 27, wherein: a horizontal resolution of each overlapping image patch comprises a sum of the horizontal pixel dimension and the overlap pixel dimension; and a vertical resolution of each overlapping image patch comprises a sum of the vertical pixel dimension and the overlap pixel dimension.

Aspect 29. The method of any of Aspects 20 to 28, wherein the overlap pixel dimension is greater than a padding dimension associated with the padded image.

Aspect 30. The method of Aspect 29, wherein the overlap pixel dimension is two times the padding dimension.

Aspect 31. The method of any of Aspects 19 to 30, wherein generating the padded image comprises: zero-padding the frame of image data using two or more layers of padding pixels located along each outer edge of the perimeter of the frame of image data.

Aspect 32. The method of Aspect 31, wherein generating the plurality of overlapping image patches comprises: generating a first image patch corresponding to a first portion of the padded image; generating a horizontally overlapping image patch corresponding to a second portion of the padded image and including four or more columns of pixels included in the first image patch; and generating a vertically overlapping image patch corresponding to a third portion of the padded image and including four or more rows of pixels included in the first image patch.

Aspect 33. The method of any of Aspects 19 to 32, wherein: each overlapping image patch of the plurality of overlapping image patches is associated with three RGB color data channels; and the channel-wise grouped input includes a corresponding three RGB color data channels for each overlapping image patch of the plurality of overlapping image patches.

Aspect 34. The method of any of Aspects 19 to 33, wherein the plurality of grouped convolutional layers are included in a channel-wise input tiled neural network.

Aspect 35. The method of any of Aspects 19 to 34, wherein the plurality of padding pixels are arranged symmetrically around the perimeter of the frame of image data.

Aspect 36. The method of any of Aspects 19 to 35, wherein the padded image is zero-padded.

Aspect 37. A non-transitory computer-readable storage medium comprising instructions stored thereon which, when executed by at least one processor, causes the at least one processor to perform operations according to any of Aspects 1 to 18.

Aspect 38. A non-transitory computer-readable storage medium comprising instructions stored thereon which, when executed by at least one processor, causes the at least one processor to perform operations according to any of Aspects 19 to 36.

Aspect 39. An apparatus comprising one or more means for performing operations according to any of Aspects 1 to 18.

Aspect 40. An apparatus comprising one or more means for performing operations according to any of Aspects 19 to 36.

Aspect 41. The apparatus of any of Aspects 1 to 18, wherein the at least one processor includes a machine learning accelerator configured to process a first quantity of channels in parallel, wherein the first quantity of channels is greater than a second quantity of channels corresponding to the input image.

Aspect 42. The method of any of Aspects 19 to 36, wherein generating the image processing output is performed using a machine learning accelerator configured to process a first quantity of channels in parallel, wherein the first quantity of channels is greater than a second quantity of channels corresponding to the input image.

Aspect 43. The apparatus of any of Aspects 1 to 18, wherein a quantity of overlapping image patches included in the plurality of overlapping image patches is a perfect square.

Aspect 44. The method of any of Aspects 19 to 36, wherein a quantity of overlapping image patches included in the plurality of overlapping image patches is a perfect square.

What is claimed is:

1. An apparatus for processing image data, comprising:
   at least one memory; and
   at least one processor coupled to the at least one memory, the at least one processor configured to:
   receive an input image, wherein the input image is a padded image including a frame of image data and a plurality of padding pixels located around a perimeter of the frame of image data;
   generate a plurality of overlapping image patches, each overlapping image patch of the plurality of overlapping image patches corresponding to a respective portion of the padded image and having a resolution;
   generate a channel-wise grouped input based on the plurality of overlapping image patches and having the resolution, wherein the channel-wise grouped input includes a corresponding channel for each respective channel of each overlapping image patch of the plurality of overlapping image patches;
   generate an image processing output based on processing the channel-wise grouped input using a plurality of grouped convolutional layers of a tiled neural network, wherein at least one grouped convolutional layer of the plurality of grouped convolutional layers does not perform internal padding; and
   determine a spatial input receptive field associated with the tiled neural network; and determine the overlap pixel dimension based on the spatial input receptive field, wherein the overlap pixel dimension is less than the spatial input receptive field;

wherein the overlap pixel dimension is equal to the spatial input receptive field minus one; and wherein each grouped convolutional layer of the plurality of grouped convolutional layers does not perform internal padding.

2. The apparatus of claim 1, wherein:
the plurality of overlapping image patches are associated with an overlap pixel dimension indicative of an overlap between adjacent overlapping image patches.

3. The apparatus of claim 1, wherein the spatial input receptive field is based on a quantity of grouped convolutional layers included in the plurality of grouped convolutional layers and a respective convolution kernel size associated with each grouped convolutional layer.

4. The apparatus of claim 1, wherein the overlap pixel dimension is less than or equal to the spatial input receptive field minus one.

5. The apparatus of claim 1, wherein:
the overlap pixel dimension is less than the spatial input receptive field minus one; and
a quantity of grouped convolutional layers of the plurality of grouped convolutional layers used to perform internal padding is based on a difference between the overlap pixel dimension and the spatial input receptive field.

6. The apparatus of claim 2, wherein the overlap pixel dimension comprises a quantity of overlapping rows of pixels or a quantity of overlapping columns of pixels associated with the overlap between adjacent overlapping image patches.

7. The apparatus of claim 2, wherein the plurality of overlapping image patches are associated with a horizontal pixel dimension and a vertical pixel dimension that are the same for each respective overlapping image patch of the plurality of overlapping image patches.

8. The apparatus of claim 7, wherein:
a horizontal resolution of each overlapping image patch comprises a sum of the horizontal pixel dimension and the overlap pixel dimension; and
a vertical resolution of each overlapping image patch comprises a sum of the vertical pixel dimension and the overlap pixel dimension.

9. The apparatus of claim 2, wherein the overlap pixel dimension is greater than a padding dimension associated with the padded image.

10. The apparatus of claim 9, wherein the overlap pixel dimension is two times the padding dimension.

11. The apparatus of claim 1, wherein, to generate the padded image, the at least one processor is configured to:
zero-pad the frame of image data using two or more layers of padding pixels located along each outer edge of the perimeter of the frame of image data.

12. The apparatus of claim 11, wherein, to generate the plurality of overlapping image patches, the at least one processor is configured to:
generate a first image patch corresponding to a first portion of the padded image;
generate a horizontally overlapping image patch corresponding to a second portion of the padded image and including four or more columns of pixels included in the first image patch; and generate a vertically overlapping image patch corresponding to a third portion of the padded image and including four or more rows of pixels included in the first image patch.

13. The apparatus of claim 1, wherein:
each overlapping image patch of the plurality of overlapping image patches is associated with three RGB color data channels; and
the channel-wise grouped input includes a corresponding three RGB color data channels for each overlapping image patch of the plurality of overlapping image patches.

14. The apparatus of claim 1, wherein the plurality of grouped convolutional layers are included in a channel-wise input tiled neural network.

15. The apparatus of claim 1, wherein the at least one processor includes a machine learning accelerator configured to process a first quantity of channels in parallel, wherein the first quantity of channels is greater than a second quantity of channels corresponding to the input image.

16. The apparatus of claim 1, wherein a quantity of overlapping image patches included in the plurality of overlapping image patches is a perfect square.

17. A method for processing image data, comprising:
receiving an input image, wherein the input image is a padded image including a frame of image data and a plurality of padding pixels located around a perimeter of the frame of image data;
generating a plurality of overlapping image patches, each overlapping image patch of the plurality of overlapping image patches corresponding to a respective portion of the padded image and having a resolution;
generating a channel-wise grouped input based on the plurality of overlapping image patches and having the resolution, wherein the channel-wise grouped input includes a corresponding channel for each respective channel of each overlapping image patch of the plurality of overlapping image patches;
generating an image processing output based on processing the channel-wise grouped input using a plurality of grouped convolutional layers of a tiled neural network, wherein at least one grouped convolutional layer of the plurality of grouped convolutional layers does not perform internal padding;
determining a spatial input receptive field associated with the tiled neural network; and
determining the overlap pixel dimension based on the spatial input receptive field, wherein the overlap pixel dimension is less than the spatial input receptive field;
wherein the overlap pixel dimension is equal to the spatial input receptive field minus one; and
wherein each grouped convolutional layer of the plurality of grouped convolutional layers does not perform internal padding.

18. The method of claim 17, wherein:
the plurality of overlapping image patches are associated with an overlap pixel dimension indicative of an overlap between adjacent overlapping image patches.

19. The method of claim 17, wherein the spatial input receptive field is based on a quantity of grouped convolutional layers included in the plurality of grouped convolutional layers and a respective convolution kernel size associated with each grouped convolutional layer.

20. The method of claim 17, wherein the overlap pixel dimension is less than or equal to the spatial input receptive field minus one.

21. The method of claim 17, wherein:
the overlap pixel dimension is less than the spatial input receptive field minus one; and
a quantity of grouped convolutional layers of the plurality of grouped convolutional layers used to perform internal padding is based on a difference between the overlap pixel dimension and the spatial input receptive field.

22. The method of claim 18, wherein:
the overlap pixel dimension comprises a quantity of overlapping rows of pixels or a quantity of overlapping columns of pixels associated with the overlap between adjacent overlapping image patches; and
the overlap pixel dimension is greater than a padding dimension associated with the padded image.

23. The method of claim 18, wherein:
the plurality of overlapping image patches are associated with a horizontal pixel dimension and a vertical pixel dimension that are the same for each respective overlapping image patch of the plurality of overlapping image patches;
a horizontal resolution of each overlapping image patch comprises a sum of the horizontal pixel dimension and the overlap pixel dimension; and
a vertical resolution of each overlapping image patch comprises a sum of the vertical pixel dimension and the overlap pixel dimension.

24. The method of claim 17, wherein generating the padded image comprises:
zero-padding the frame of image data using two or more layers of padding pixels located along each outer edge of the perimeter of the frame of image data.

25. The method of claim 24, wherein generating the plurality of overlapping image patches comprises:
generating a first image patch corresponding to a first portion of the padded image;
generating a horizontally overlapping image patch corresponding to a second portion of the padded image and including four or more columns of pixels included in the first image patch; and
generating a vertically overlapping image patch corresponding to a third portion of the padded image and including four or more rows of pixels included in the first image patch.

26. The method of claim 17, wherein:
each overlapping image patch of the plurality of overlapping image patches is associated with three RGB color data channels; and
the channel-wise grouped input includes a corresponding three RGB color data channels for each overlapping image patch of the plurality of overlapping image patches.

\* \* \* \* \*